(12) United States Patent
Imai

(10) Patent No.: US 7,904,957 B2
(45) Date of Patent: Mar. 8, 2011

(54) COMPUTER-READABLE RECORDING MEDIUM RECORDING A SECURITY MANAGEMENT PROGRAM, COMPUTER-READABLE RECORDING MEDIUM RECORDING A JOB SUBMISSION MANAGEMENT PROGRAM, AND SECURITY MANAGEMENT METHOD

(75) Inventor: Yuji Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1163 days.

(21) Appl. No.: 11/496,500

(22) Filed: Aug. 1, 2006

(65) Prior Publication Data

US 2007/0195358 A1 Aug. 23, 2007

(30) Foreign Application Priority Data

Feb. 20, 2006 (JP) ................................ 2006-042512

(51) Int. Cl.
*G06F 12/14* (2006.01)
(52) U.S. Cl. .......................................................... 726/22
(58) Field of Classification Search ........................ None
See application file for complete search history.

(56) References Cited

U.S. PATENT DOCUMENTS

2005/0213768 A1* 9/2005 Durham et al. ............... 380/278
2007/0169171 A1* 7/2007 Kumar et al. ..................... 726/2

OTHER PUBLICATIONS

Patent Abstracts of Japan, Japanese Publication No. 2002-082907, Published Mar. 22, 2002.

* cited by examiner

*Primary Examiner* — Brandon S Hoffman
(74) *Attorney, Agent, or Firm* — Staas & Halsey LLP

(57) ABSTRACT

A computer-readable recording medium recording a security management program which enables nodes for executing jobs to omit virus check while maintaining the security of a system. When a job execution request including a program is input, a sender decision unit compares the identification of the job sender with reliable device information, to determine whether or not the program has been transmitted from a reliable device. Subsequently, a job manager outputs a start request specifying the program. If the program is judged to have been transmitted from a device other than the reliable devices, a safety decision unit outputs a virus check request, whereupon a virus checker executes code check on the program.

12 Claims, 18 Drawing Sheets

314 CLIENT SAFETY MANAGEMENT TABLE

| ID | RELIABILITY |
|---|---|
| CLIENT #1 | Lv. 1 |
| CLIENT #2 | Lv. 2 |
| CLIENT #3 | Lv. 3 |
| ⋮ | ⋮ |

FIG. 14

326b PROGRAM SAFETY MANAGEMENT TABLE

| FILENAME | RELIABILITY |
|---|---|
| PROGRAM A | Lv. 1 |
| PROGRAM B | Lv. 2 |
| PROGRAM C | Lv. 3 |
| ⋮ | ⋮ |

FIG. 15

COMPUTER-READABLE RECORDING MEDIUM RECORDING A SECURITY MANAGEMENT PROGRAM, COMPUTER-READABLE RECORDING MEDIUM RECORDING A JOB SUBMISSION MANAGEMENT PROGRAM, AND SECURITY MANAGEMENT METHOD

CROSS-REFERENCE TO RELATED APPLICATIONS

This application is based upon and claims the benefits of priority from the prior Japanese Patent Application No. 2006-042512, filed on Feb. 20, 2006, the entire contents of which are incorporated herein by reference.

BACKGROUND OF THE INVENTION

1. Field of the Invention

The present invention relates to computer-readable recording media recording a security management program, computer-readable recording media recording a job submission management program, and security management methods whereby security at the time of executing jobs is ensured. More particularly, the present invention relates to a computer-readable recording medium recording a security management program, a computer-readable recording medium recording a job submission management program, and a security management method whereby security is ensured when jobs submitted from other devices are executed.

2. Description of the Related Art

In order to perform enormous amounts of computations through parallel processing, many corporations employ grid systems. In grid systems, a large number of nodes (computers for executing jobs) are connected by a network and processes to be executed are assigned to individual nodes and executed in parallel.

A grid system using corporate client PCs (Personal Computers) as such nodes is required to be able to draw out as high performance as possible from the PCs operating under various conditions. Systems have therefore been contrived in which a part of process usually performed by the individual nodes is taken care of by a separate computer. For example, a technique is known wherein a relay device is adapted to verify whether a certificate transmitted from the server to a client is valid, and with respect to the certificate whose validity has been verified by the relay device, the client omits validity check of the certificate (e.g., Unexamined Japanese Patent Publication No. 2002-82907).

With the technique disclosed in Unexamined Japanese Patent Publication No. 2002-82907, however, only a temporary process executed on reception of a certificate can be omitted since the certificate verification process is taken care of by the relay device, and the load imposed by other processes cannot be mitigated. In current grid systems, one of primary factors of high processing load on nodes is virus check process.

For example, corporate client PCs are provided with an antivirus function whereby code check is performed at the start of programs and also the behavior of processes during the execution of programs is monitored in real time in case the programs have an unknown security flaw. Real-time monitoring is a process in which, each time a user process program outputs a process request to the OS (Operating System), the process request is intercepted to ascertain that the request involves no security problem. If it is ascertained that the process request involves no security problem, the request is passed on to the OS.

Such code check and real-time monitoring are a main cause of deterioration in the computation performance. Especially, in the case of grid jobs (jobs executed in parallel by a grid system) requiring high computation performance, if code check and real-time monitoring are executed in all nodes, the overall computation performance deteriorates noticeably.

SUMMARY OF THE INVENTION

The present invention was created in view of the above circumstances, and an object thereof is to provide a computer-readable recording medium recording a security management program, a computer-readable recording medium recording a job submission management program, and a security management method which enable nodes for executing jobs to omit virus check while maintaining the security of a system.

To achieve the object, there is provided a computer-readable recording medium recording a security management program for managing security of jobs submitted via a network. The security management program recorded on the recording medium causes a computer to function as a sender decision unit holding in advance reliable device information indicating identifications of reliable devices, the sender decision unit being responsive to a request to execute a job including a program, input via the network, for comparing an identification of a sender of the job with those of the reliable device information to determine whether or not the program has been transmitted from a reliable device, a job manager for storing the input program in a storage device and outputting a start request specifying the program, a safety decision unit for causing an operating system to execute the start request if it is judged by the sender decision unit that the program specified by the start request output from the job manager has been transmitted from a reliable device, and outputting a virus check request if it is judged by the sender decision unit that the program specified by the start request has been transmitted from a device other than the reliable devices, and a virus checker, responsive to the virus check request output from the safety decision unit, for reading out the program specified by the start request from the storage device, executing a code check process for ascertaining that the program does not contain a code sequence included in a known virus, and, if the code sequence is not contained, causing the operating system to execute the start request.

Also, to achieve the above object, there is provided a computer-readable recording medium recording a job submission management program for allocating a job requested from a client to a plurality of computers to be executed by distributed processing. The job submission management program recorded on the recording medium causes a computer to function as a certificate verifier, responsive to input of a job submission request including a certificate and a program, for checking the certificate for authenticity, a safety information setting unit for affixing safety information indicative of safety of the program if authenticity of the certificate is verified by the certificate verifier, and a job allocator for selecting a node to which execution of a job is requested, and transmitting, to the selected node, a job execution request including the program to which the safety information has been affixed by the safety information setting unit.

Further, to achieve the above object, there is provided a security management method for managing security of jobs submitted via a network. The security management method comprises the step, executed in response to input of a job submission request including a certificate and a program, of causing a certificate verifier of a job management device to check the certificate for authenticity, the step, executed if authenticity of the certificate is verified by the certificate verifier, of causing a job allocator of the job management device to select a job execution device to which execution of a job is requested, and to transmit a job execution request including the program to the selected job execution device, the step, executed in response to input of the job execution request with the program via the network, of causing a sender decision unit of the job execution device holding in advance reliable device information indicating identifications of reliable devices, to compare an identification of a job sender with those of the reliable device information to determine whether or not the program has been transmitted from a reliable device, the step of causing a job manager of the job execution device to store the input program in a storage device and to output a start request specifying the program, the step of causing a safety decision unit of the job execution device to have an operating system execute the start request if it is judged by the sender decision unit that the program specified by the start request output from the job manager has been transmitted from a reliable device, and to output a virus check request if it is judged by the sender decision unit that the program specified by the start request has been transmitted from a device other than the reliable devices, and the step, executed in response to the virus check request output from the safety decision unit, of causing a virus checker of the job execution device to read out the program specified by the start request from the storage device, to execute a code check process for ascertaining that the program does not contain a code sequence included in a known virus, and, if the code sequence is not contained, to cause the operating system to execute the start request.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 14 shows an exemplary data structure of a client safety management table.

FIG. 15 shows an exemplary data structure of a program safety management table.

DESCRIPTION OF THE PREFERRED EMBODIMENTS

Figure 1:
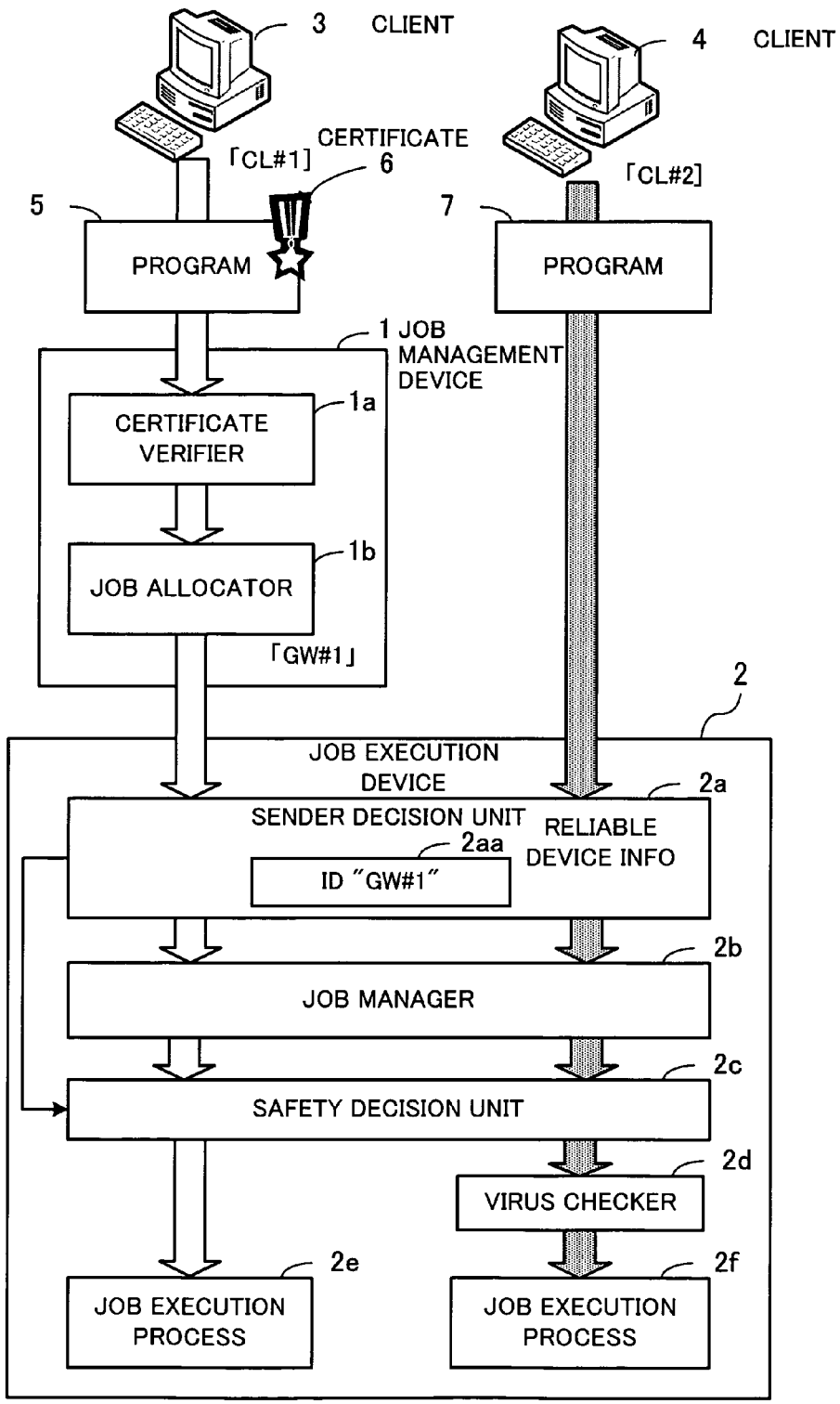
FIG. 1 schematically illustrates the present invention.

Preferred embodiments of the present invention will be described below with reference to the accompanying drawings, wherein like reference numerals refer to like elements throughout.

FIG. 1 schematically illustrates the present invention. In the example shown in FIG. 1, a job submitted from a client 3 is transferred via a job management device 1 to a job execution device 2. When submitting the job, the client 3 transfers a program 5 affixed with a certificate 6 to the job management device 1. On the other hand, a job submitted from a client 4 is transferred directly to the job execution device 2. When submitting the job, the client 4 transfers a program 7 to the job execution device 2.

In the example of FIG. 1, the job management device 1 is assigned an identification "GW#1", the client 3 is assigned an identification "CL#1", and the client 4 is assigned an identification "CL#2".

The job management device 1 allocates jobs submitted thereto. To this end, the job management device 1 includes a certificate verifier 1a and a job allocator 1b.

When input with a job submission request including the certificate 6 and the program 5, the certificate verifier 1a checks the certificate for authenticity. The certificate 6 is information certifying that the program 5 was created by an author who is previously proved to be a person not conducting a dishonest act.

If authenticity of the certificate 6 is verified by the certificate verifier 1a, the job allocator 1b selects a job execution device 2 to which execution of the job is requested. Then, the job allocator 1b transmits a job execution request including the program to the selected job execution device 2.

The job execution device 2 executes the submitted jobs by job execution processes 2e and 2f. At this time, with respect to a job submitted from a reliable device, the job execution device omits virus check. To this end, the job execution device 2 includes a sender decision unit 2a, a job manager 2b, a safety decision unit 2c, and a virus checker 2d.

The sender decision unit 2a holds in advance reliable device information 2aa indicating identifications of reliable devices and, when input with the job execution request including the program 5, 7 via a network, compares the identification of the job sender with those of the reliable device information. Then, based on the result of comparison, the sender decision unit 2a determines whether or not the program 5, 7 has been transmitted from a reliable device. Specifically, if the identification of the job sender coincides with any of the identifications set in the reliable device information 2aa, the sender decision unit 2a judges that the program 5, 7 has been transmitted from a reliable device. If, on the other hand, the identification of the job sender does not coincide with any of the identifications set in the reliable device information 2aa, the sender decision unit 2a judges that the program 5, 7 has been transmitted from a device other than the reliable devices.

The job manager 2b stores the input program 5, 7 in a storage device and outputs a start request specifying the program 5, 7.

If it is judged by the sender decision unit 2a that the program 5, 7 specified by the start request output from the job manager 2b has been transmitted from a reliable device, the safety decision unit 2c causes the operating system to execute the start request. On the other hand, if it is judged by the sender decision unit 2a that the program 5, 7 specified by the start request has been transmitted from a device other than the reliable devices, the safety decision unit 2c outputs a virus check request.

In response to the virus check request output from the safety decision unit 2c, the virus checker 2d reads, from the storage device, the program 5, 7 specified by the start request and executes a code check process. The code check process is a process for ascertaining that the program 7 does not contain any of code sequences included in known viruses. If it is found as a result of the code check process that the program does not contain any of the code sequences of known viruses, the virus checker 2d causes the operating system to execute the start request.

On receiving the start request, the operating system generates the job execution process 2e, 2f and executes the job.

A security management program describing the aforementioned procedure is executed by a computer, and this makes it possible to omit the virus check with respect to the jobs submitted from the job management device 1. For example, in the case of the job submitted from the client 3, the program 5 affixed with the certificate 6 is input to the job management device 1, whereupon the certificate verifier 1a checks the certificate 6. If authenticity of the certificate 6 is verified, the job allocator 1b allocates the job. Then, the job allocator 1b transmits a job execution request including the program 5 to the job execution device 2 to which the job has been allocated.

When the job execution device 2 is input via the network with the job execution request including the program 5, 7, the sender decision unit 2a compares the identification of the job sender with those of the reliable device information 2aa to determine whether or not the program 5, 7 has been transmitted from a reliable device. The identification "GW#1" is set in the reliable device information 2aa, and therefore, the sender decision unit 2a judges that the program 5 from the job management device 1 has been transmitted from a reliable device. Also, the sender decision unit 2a judges that the program 7 from the client 4 has been transmitted from a device other than the reliable devices.

Subsequently, the job manager 2b stores the input program 5, 7 in the storage device and outputs a start request specifying the program 5, 7. The program 5 is judged by the sender decision unit 2a to have been transmitted from a reliable device, and accordingly, the start request is executed by the operating system without performing the virus check. Specifically, the job execution process 2e is generated and the process described in the program 5 is executed by the job execution process 2e.

On the other hand, the program 7 is judged by the sender decision unit 2a to have been transmitted from a device other than the reliable devices, and therefore, the safety decision unit 2c outputs a virus check request, whereupon the virus checker 2d reads out the program 7 from the storage device and executes the code check process. If it is found as a result of the code check process that the program 7 does not contain any of the code sequences of viruses, the start request is executed by the operating system. Namely, the job execution process 2f is generated and the process described in the program 7 is executed by the job execution process 2f.

In this manner, safety of the program 5 is guaranteed by the job management device 1, and this enables the job execution device 2 to omit the virus check with respect to the program 5 input via the job management device 1. Consequently, the processing load applied to the job execution device 2 at the time of executing the job can be lessened.

Where the system shown in FIG. 1 is applied to a grid system, the effect of lessening load can be further heightened. Specifically, in a grid system, jobs are submitted via a gateway and are distributed to multiple nodes. If, at this time, virus check is performed in all nodes, the overall processing efficiency lowers. By making the gateway guarantee the safety of programs so that the virus check can be omitted with respect to the programs submitted via the gateway, it is possible to lessen the processing load while at the same time maintaining the security of the whole system.

Embodiments of the present invention will be now described in detail, wherein the invention is applied to a grid system, by way of example.

First Embodiment

In the first embodiment, with respect to jobs submitted from a reliable grid manager, virus check is omitted on the assumption that the programs of such jobs are all safe. In the following description of the first embodiment, it is assumed that only the code check process, among various virus check processes, is omitted, for simplicity's sake.

Figure 2:
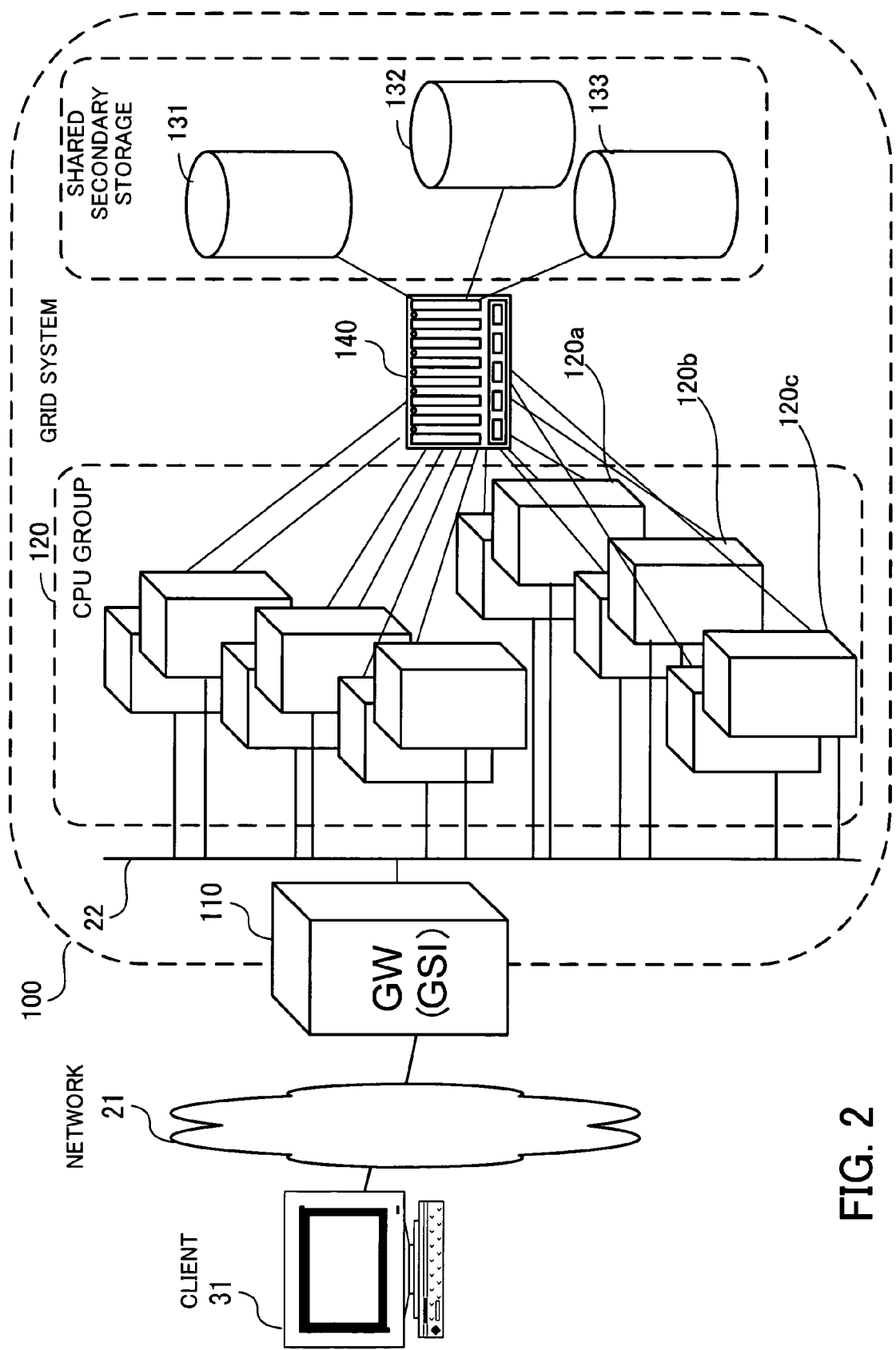
FIG. 2 shows an exemplary system configuration of the invention.

FIG. 2 shows an exemplary system configuration according to the embodiment. A client 31 is connected via a network 21 to a gateway (GW) 110 of a grid system 100.

The grid system 100 includes, in addition to the gateway 110, a CPU group 120 constituted by a plurality of nodes 120a, 120b, 120c, . . . , a fiber channel (FC) 140, and a plurality of shared secondary storage devices 131, 132 and 133.

The gateway 110 and the individual nodes 120a, 120b, 120c, . . . are connected by a network 22, and the nodes 120a, 120b, 120c, . . . and the shared secondary storage devices 131, 132 and 133 are connected via the fiber channel 140.

The gateway 110 accepts a job submission request from the client 31. At this time, the gateway 110 checks the certificate affixed to the input job. The certificate is checked for authenticity by using, for example, GSI (Grid Security Infrastructure) function. If authenticity of the certificate is verified, the gateway 110 divides the job and submits the divided jobs to nodes in the CPU group 120.

The nodes 120a, 120b, 120c, . . . , which constitute the CPU group 120, execute the jobs submitted from the gateway 110. At this time, each of the nodes 120a, 120b, 120c, . . . stores/reads data in/from the shared secondary storage devices 131, 132 and 133 as needed.

Figure 3:
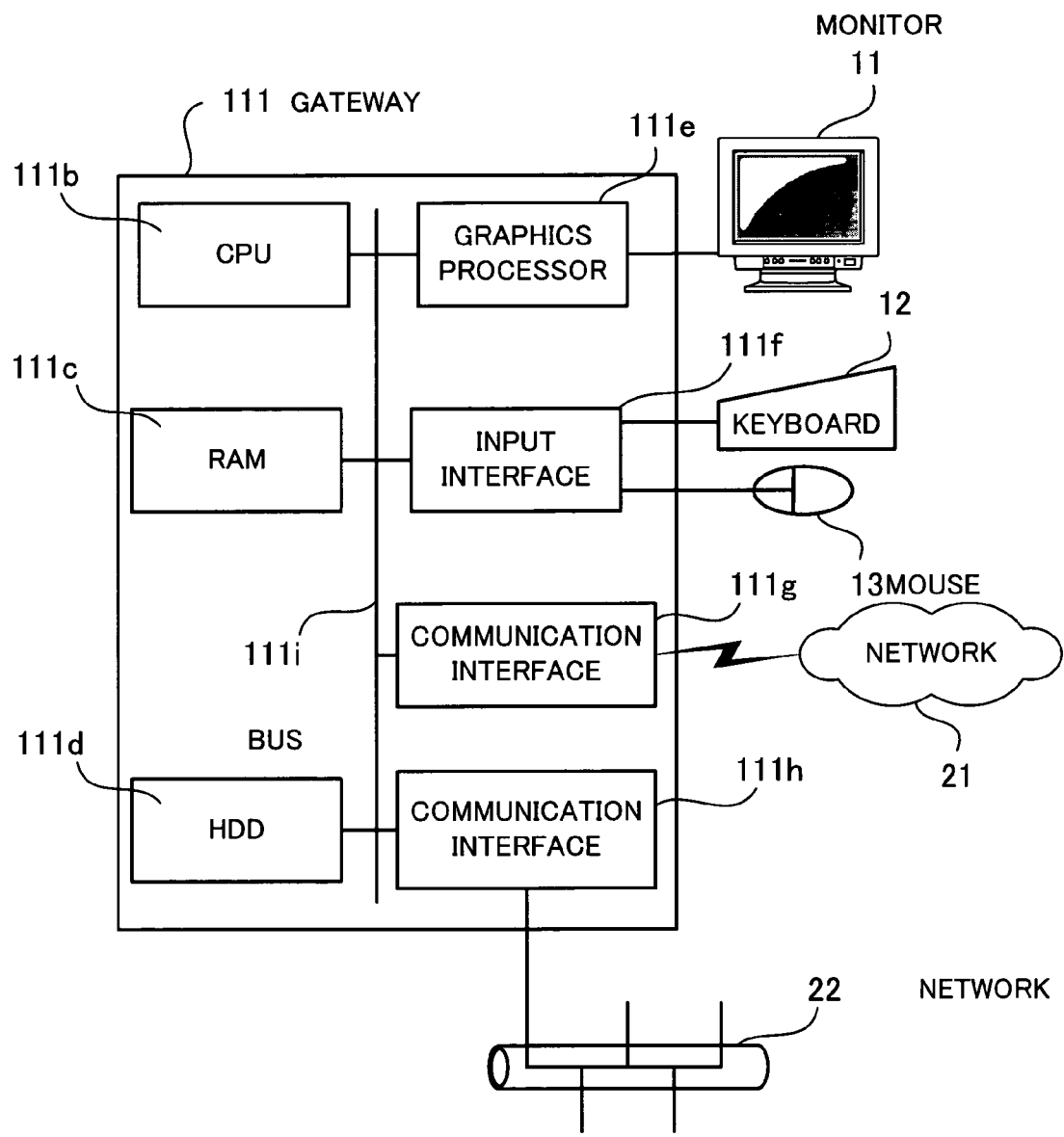
FIG. 3 shows an exemplary hardware configuration of a gateway used in the invention.

FIG. 3 shows an exemplary hardware configuration of the gateway used in the embodiment. The gateway 110 operates under the control of a CPU (Central Processing Unit) 111b. The CPU 111b is connected, via a bus 111i, with a RAM (Random Access Memory) 111c, a hard disk drive (HDD) 111d, a graphics processor 111e, an input interface 111f, and communication interfaces 111g and 111h.

The RAM 111c temporarily stores at least part of the OS and application programs executed by the CPU 111b. Also, the RAM 111c stores various other data necessary for the processing by the CPU 111b. The HDD 111d stores the OS and application programs.

The graphics processor 111e is connected with a monitor 11 and, in accordance with instructions from the CPU 111b, displays images on the screen of the monitor 11. The input interface 111f is connected with a keyboard 12 and a mouse 13, and sends signals from the keyboard 12 and the mouse 13 to the CPU 111b via the bus 111i.

The communication interface 111g is connected to the network 21 and transmits/receives data to/from the client 31 via the network 21.

The communication interface 111h is connected to the network 22 and transmits/receives data to/from the nodes 120a, 120b, 120c, . . . via the network 22.

The processing function of the embodiment is accomplished by the hardware configuration described above. Although FIG. 3 shows the hardware configuration of the gateway 110, each of the nodes 120a, 120b, 120c, . . . may also have a similar hardware configuration.

Figure 4:
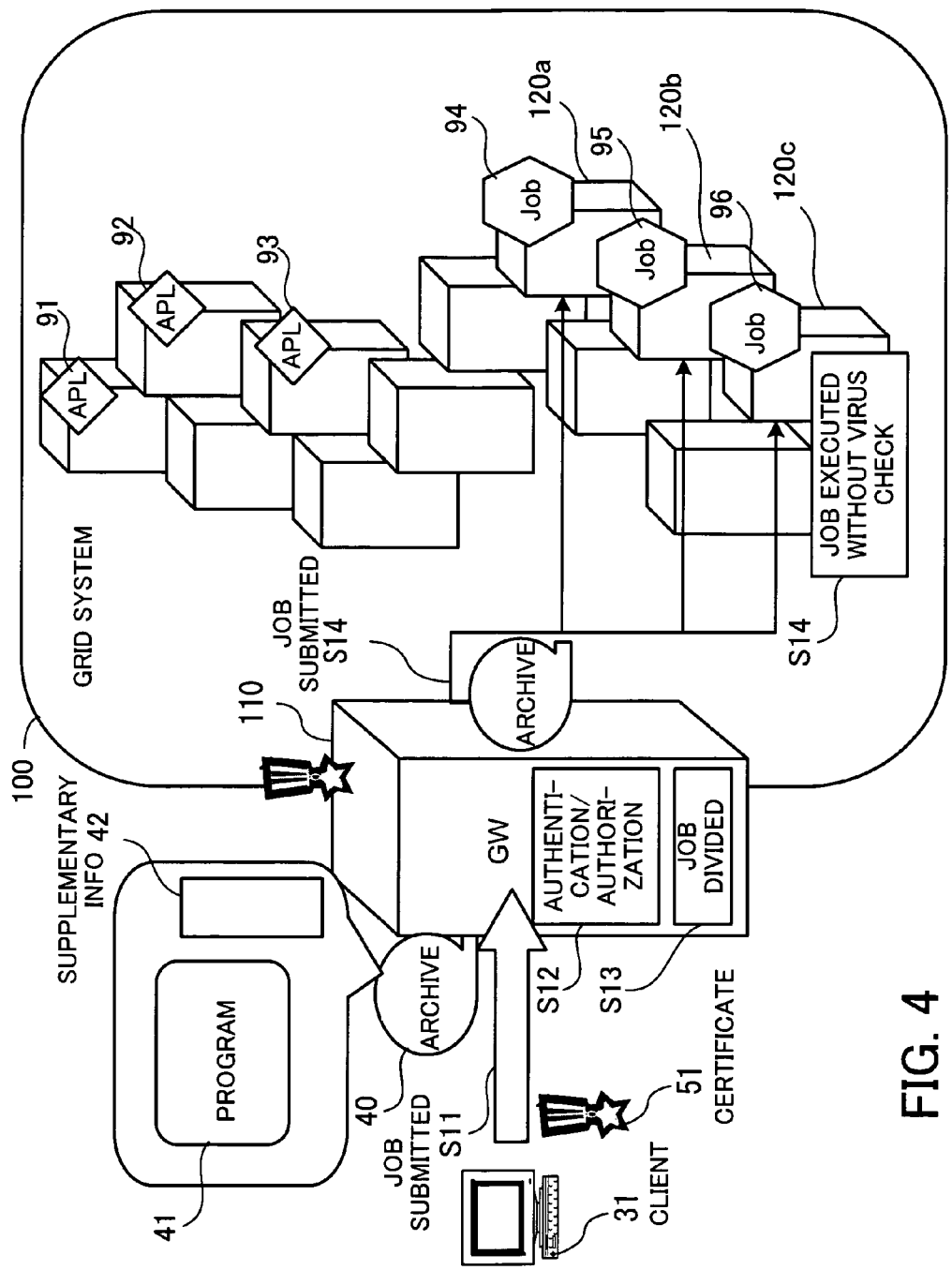
FIG. 4 is a conceptual diagram illustrating a process according to a first embodiment.

FIG. 4 is a conceptual diagram illustrating a process according to the first embodiment. The nodes constituting the grid system 100 execute client applications 91 to 93, and among these, some nodes (in the example of FIG. 4, nodes 120a, 120b and 120c) execute jobs 94 to 96.

First, a job is submitted from the client 31 (Step S11). When submitting a job, the client 31 transmits an archive 40 with a certificate 51, in addition to a job execution request, to the gateway 110. The archive 40 is a single file which is the combination of a program 41 and supplementary information 42. In the program 41 is described the process for executing the job requested from the client 31, and in the supplementary information 42 are set environments (e.g., locations of the databases to be looked up) necessary for executing the job.

As the archive 40, ZAR (zero administration archive) may be used, for example. ZAR is an archive which permits a job to be executed only on the basis of the information (program and supplementary information) provided by ZAR. Namely, functions such as predetermined libraries need not be previously incorporated into the individual nodes 120a, 120b, 120c, . . . to execute jobs.

The certificate 51 is data for verifying, through a certification authority, authenticity of the author of the archive 40. This function is defined, for example, in SSL (Secure Socket Layer).

On receiving the archive 40 with the certificate 51, the gateway 110 checks the certificate 51 for authentication and authorization (Step S12). The certificate may be verified through a certification authority, not shown.

If authenticity of the certificate 51 is verified, the gateway 110 divides the job (Step S13) and then submits the divided jobs to the respective nodes 120a, 120b and 120c (Step S14). When the jobs are submitted, a job execution request and the archive 40 are transmitted to each of the nodes 120a, 120b and 120c.

At the nodes 120a, 120b and 120c to which the jobs have been submitted, the program 41 and the supplementary information 42 are extracted from the archive 40 and the program 41 is executed. At this time, each of the nodes 120a, 120b and 120c checks the sender of the submitted job and, on ascertaining that the job has been submitted from a reliable grid manager (in this embodiment, function incorporated in the gateway 110), instantly executes the program 41 without performing virus check.

The following explains the functions of the gateway 110 and the node necessary to perform the process shown in FIG. 4.

Figure 5:
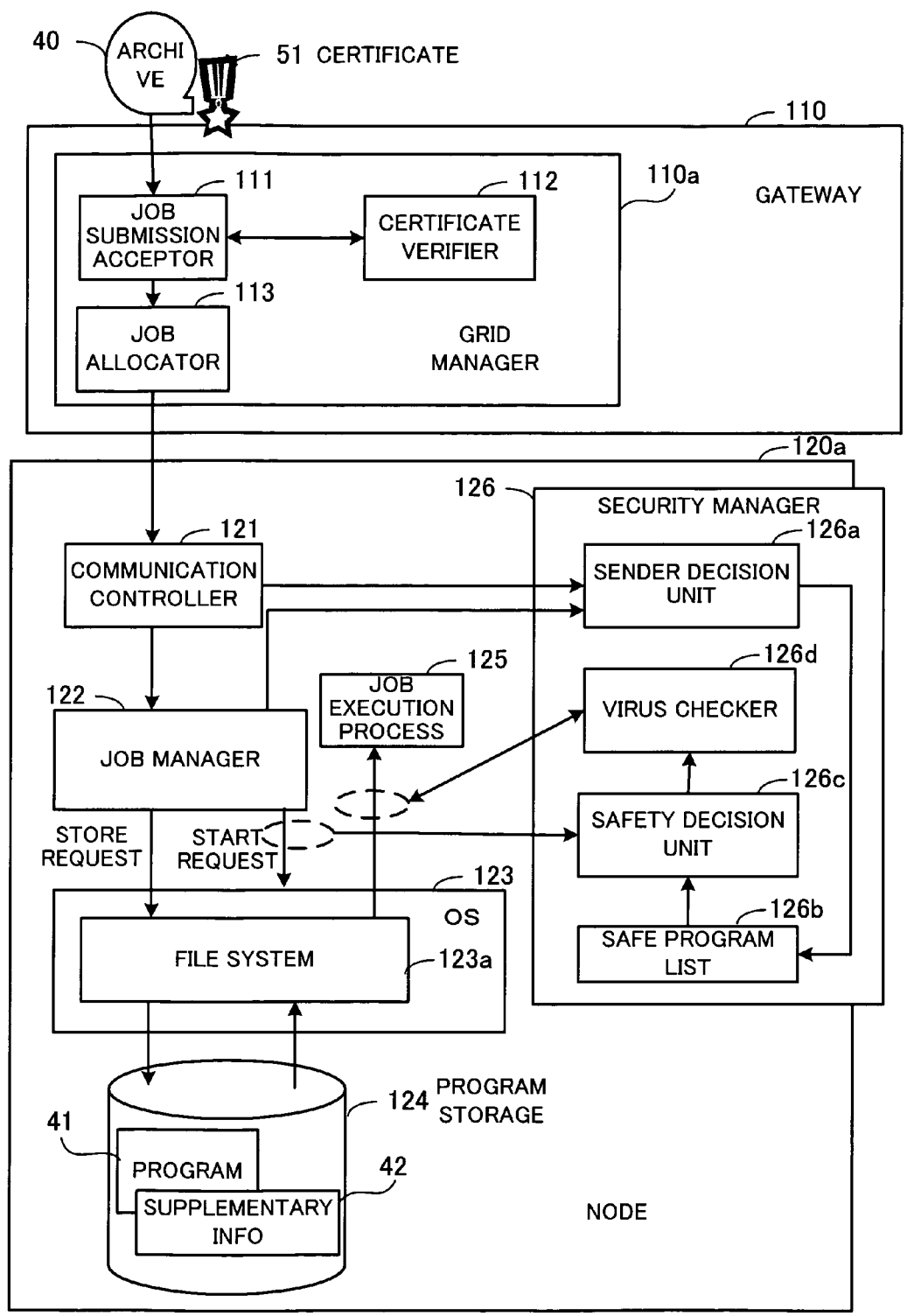
FIG. 5 is a block diagram illustrating the processing function of the gateway and of a node according to the first embodiment.

FIG. 5 is a block diagram illustrating the processing functions of the gateway and the node according to the first embodiment. In FIG. 5, the function of the node 120a is illustrated as a typical example, and the other nodes also have the same function as the node 120a.

The gateway 110 has a grid manager 110a for managing jobs to be executed by the grid system 100. The grid manager 110a comprises a job submission acceptor 111, a certificate verifier 112, and a job allocator 113.

The job submission acceptor 111 receives the archive 40 with the certificate 51 from the client 31 and transfers the certificate 51 to the certificate verifier 112. Then, if the result of verification received from the certificate verifier 112 is that the certificate is authentic, the job submission acceptor 111 transfers the archive 40 to the job allocator 113.

On receiving the certificate 51, the certificate verifier 112 verifies whether the author of the archive 40 is authentic or not, based on the received certificate. This authentication process is performed, for example, by making a request for authentication to a certification authority, not shown. If the certificate 51 is found to be authentic, the certificate verifier 112 notifies the job submission acceptor 111 of authenticity of the certificate.

In order to have the submitted job executed by a plurality of nodes, the job allocator 113 determines nodes which are to execute the job. For example, the loads on the individual nodes are monitored, and nodes with low load are selected as nodes for executing the job. After determining the nodes for executing the job, the job allocator 113 submits the job to the individual nodes. Specifically, the job allocator 113 transmits a job execution request and the archive 40 to each of the determined nodes.

The node 120a has a communication controller 121, a job manager 122, an OS 123, a program storage 124, a job execution process 125, and a security manager 126.

The communication controller 121 receives the archive 40 from the gateway 110 and transfers the received archive 40 to the job manager 122. At this time, the communication controller 121 transfers the IP address of the gateway 110, from which the archive 40 has been received, to a sender decision unit 126a of the security manager 126.

On receiving the archive 40, the job manager 122 extracts the program 41 and the supplementary information 42 from the archive 40. Then, the job manager 122 stores, through a file system 123a of the OS 123, the program 41 and the supplementary information 42 in the program storage 124. At this time, the job manager 122 notifies the sender decision unit 126a in the security manager 126 of the filename of the extracted program 41. Subsequently, the job manager 122 outputs, to the OS 123, a request to start the program 41.

The OS 123 manages the overall process of the node 120a. For example, when the request to start the program 41 is input from the job manager 122, the OS 123 starts the job execution process 125 to have the program 41 executed by the job execution process 125. File management is taken care of by the file system 123a in the OS 123.

The file system 123a in the OS 123 manages files input to and output from the program storage 124. Specifically, when a request to store the program 41 and the supplementary information 42 is received from the job manager 122, the file system 123a writes the program and the supplementary information in the program storage 124. Also, when the request to start the program 41 is output from the job manager 122 to the OS 123, the file system 123a reads out the program 41 from the program storage 124 and stores the program in a memory area which is managed by the job execution process 125.

The program storage 124 is a storage area for storing the program 41 and the supplementary information 42 necessary to execute the submitted job.

The job execution process 125 executes a process in accordance with the program 41. Also, the job execution process 125 looks up the supplementary information in the program storage 124 to acquire the environmental information necessary to execute the program 41.

The security manager 126 takes care of security management of jobs to be executed at the request of the client 31. Specifically, where a job has been submitted from the gateway 110, the security manager 126 omits the virus check with respect to the corresponding program 41 for executing the job. To carry out the security management of jobs, the security manager 126 includes, in addition to the sender decision unit 126a, a safe program list 126b, a safety decision unit 126c, and a virus checker 126d.

The sender decision unit 126a acquires the IP address of the sender of the archive 40 from the communication controller 121. The sender decision unit 126a previously holds the IP address of the gateway 110 and compares the address with the IP address of the archive 40 to determine whether or not the sender of the archive is the gateway 110. After ascertaining that the archive 40 has been transmitted from the gateway 110, the sender decision unit 126a acquires the filename of the program 41 contained in the archive 40 from the job manager 122 and registers the filename in the safe program list 126b.

In the safe program list 126b are registered the filenames of programs for executing the jobs submitted from the reliable grid manager 110a.

When a start request specifying the filename of the program 41 is output from the job manager 122 to the OS 123, the safety decision unit 126c checks safety of the file specified by the start request. Specifically, the safety decision unit 126c determines whether or not the filename specified by the start request is registered in the safe program list 126b. If the filename is registered in the safe program list 126b, it is judged that the program 41 corresponding to the filename is safe. If, on the other hand, the filename is not registered in the safe program list 126b, it is judged that safety of the program 41 corresponding to this filename cannot be guaranteed. The safety decision unit 126c notifies the virus checker 126d of the result of determination.

The virus checker 126d checks programs for viruses in the manner described below. When the program 41 is read out by the OS 123 in response to the start request from the job manager 122, the virus checker 126d determines whether virus check needs to be carried out or not before the program 41 is transferred to the job execution process 125. Specifically, if the determination result received from the safety decision unit 126c shows that the program is safe, the virus checker 126d judges that no virus check is necessary. On the other hand, if the determination result received from the safety decision unit 126c indicates that safety of the program cannot be guaranteed, the virus checker 126d judges that the virus check is required.

If no virus check is necessary, the virus checker 126d transfers the program 41, which has been read out by the file system 123a in response to the start request, to the job execution process 125 without performing the virus check on the program. On the other hand, if the virus check is required, the virus checker 126d performs the virus check on the program 41 read out by the file system 123a in response to the start request. If, as a result of the virus check, no problem is detected, the virus checker 126d transfers the program 41 to the job execution process 125.

Figure 6:
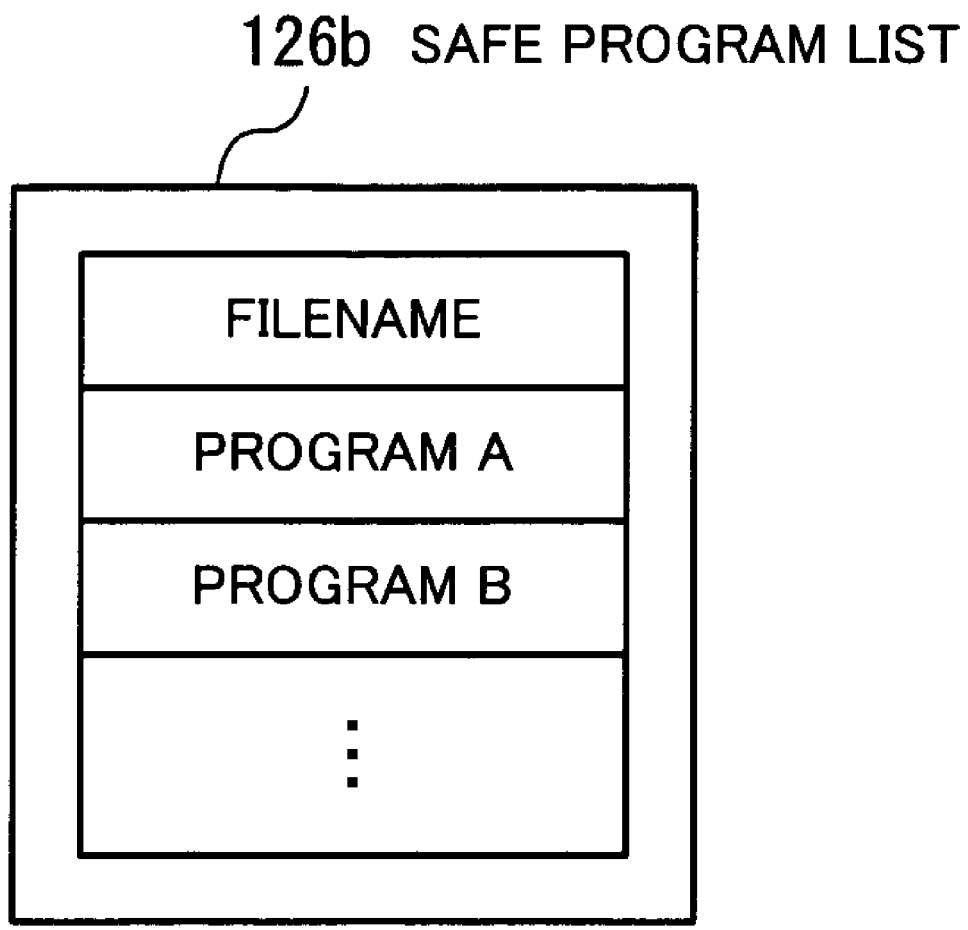
FIG. 6 shows an exemplary data structure of a safe program list.

FIG. 6 exemplifies the data structure of the safe program list. In the safe program list 126b are registered the filenames of programs of which the sender has been ascertained to be the reliable grid manager 110a.

The configuration described above enables the individual nodes to omit the virus check when executing jobs. The following describes the process performed from the submission to the execution of a job.

Figure 7:
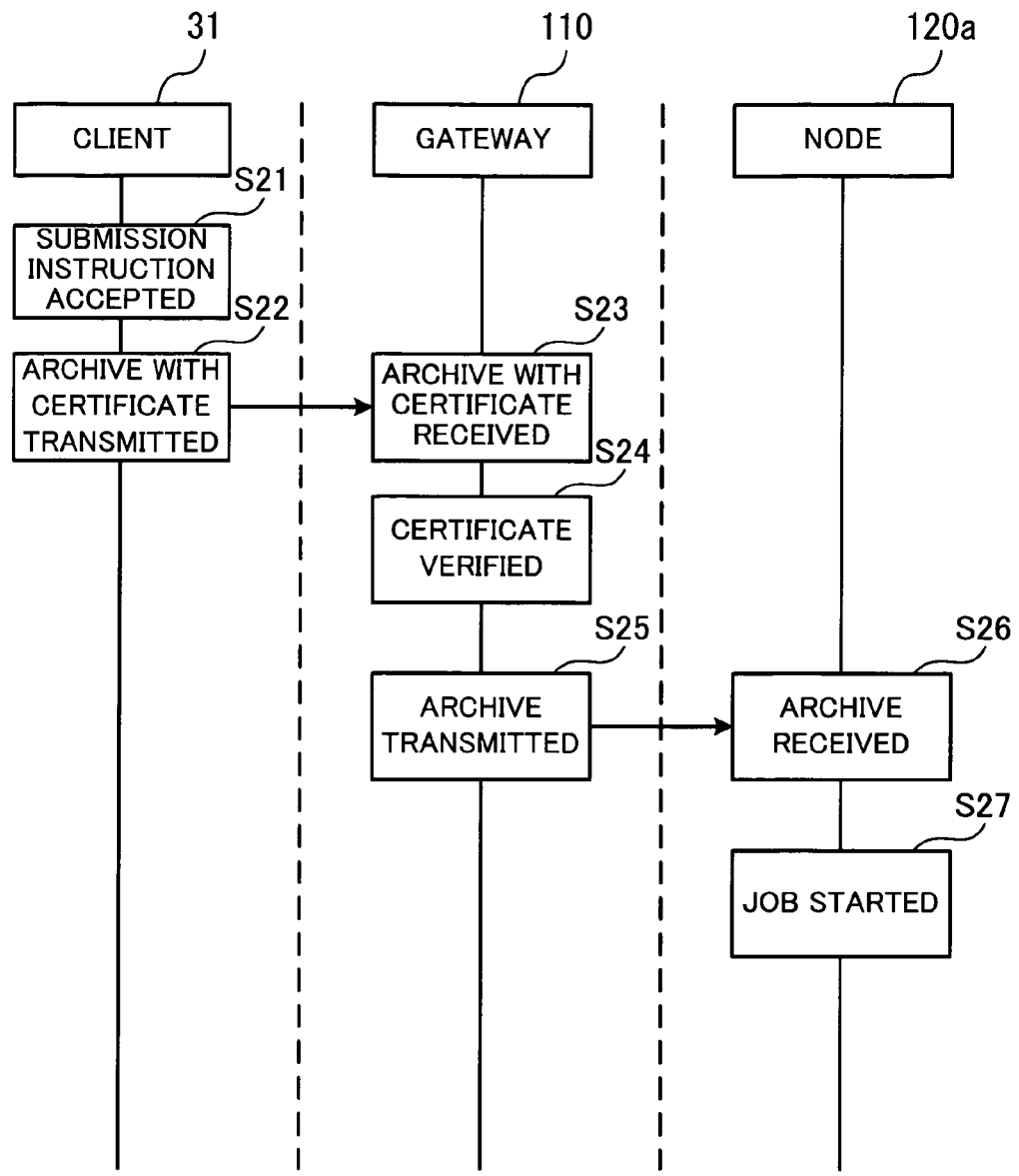
FIG. 7 is a sequence diagram illustrating a job execution procedure according to the first embodiment.

FIG. 7 is a sequence diagram illustrating a job execution procedure according to the first embodiment. In the following, the process shown in FIG. 7 will be explained in order of step number.

Step S21: The client 31 accepts a job submission instruction from the user.

Step S22: The client 31 transmits the archive 40 with the certificate 51 to the gateway 110.

Step S23: On receiving the archive 40 with the certificate 51, the job submission acceptor 111 of the gateway 110 transfers the certificate 51 to the certificate verifier 112.

Step S24: The certificate verifier 112 of the gateway 110 verifies whether the certificate 51 is authentic or not, and then notifies the job submission acceptor 111 of the result of verification.

Step S25: If authenticity of the certificate 51 is verified, the job submission acceptor 111 transfers the archive 40 to the job allocator 113. The job allocator 113 selects one or more nodes which are to execute the job, and then transmits the archive 40 to the selected nodes. In the illustrated example, the archive 40 is transmitted to the node 120a.

Step S26: The node 120a receives the archive 40.

Step S27: The node 120a starts the job execution process 125 and executes the program 41 contained in the received archive 40. The process executed by the node 120a will be explained in detail with reference to FIG. 8.

Figure 8:
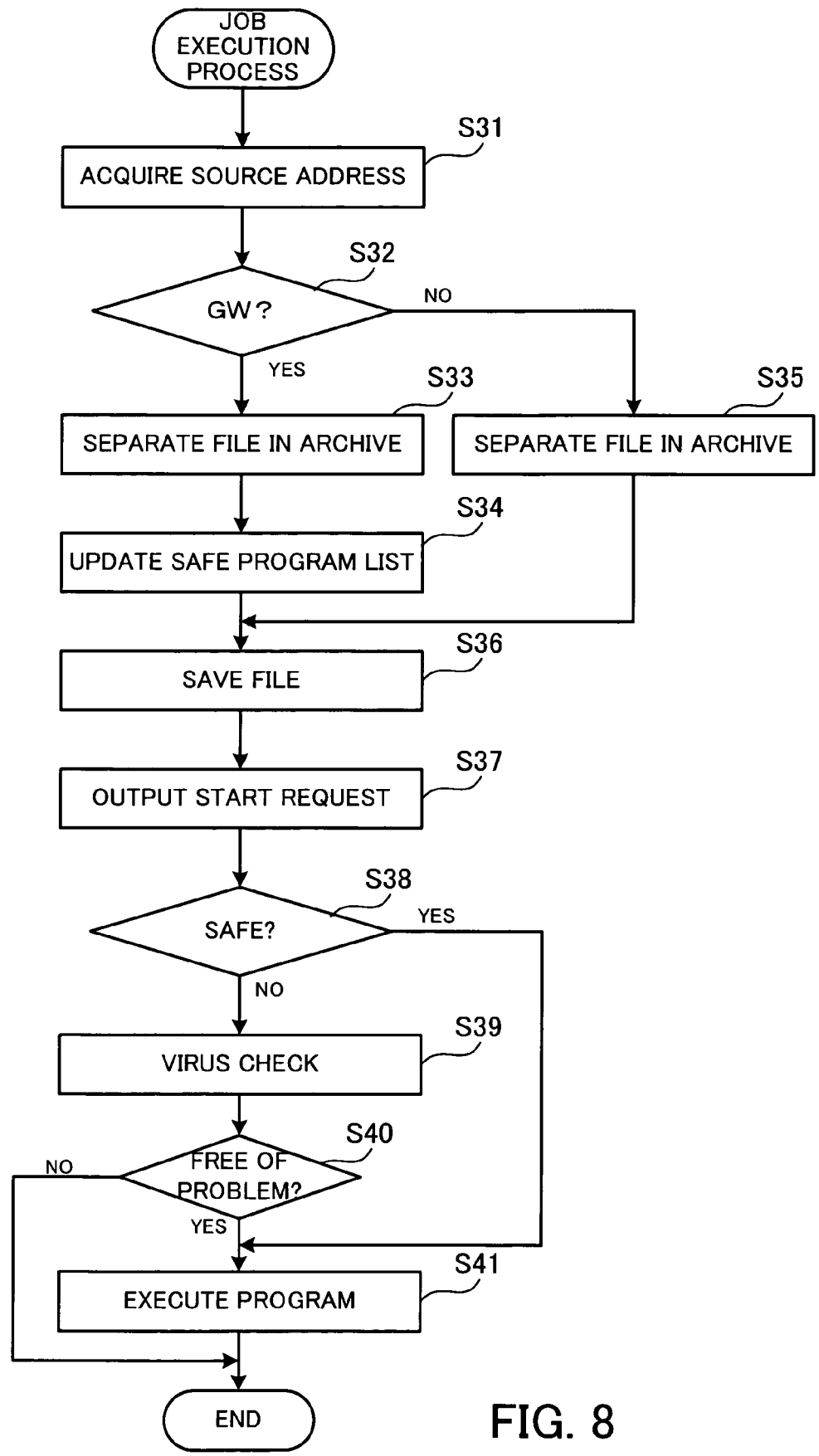
FIG. 8 is a flowchart illustrating a job execution process executed by the node.

FIG. 8 is a flowchart illustrating the job execution process performed by the node. In the following, the process shown in FIG. 8 will be explained in order of step number.

Step S31: The communication controller 121 acquires the source address of the received archive 40 and transfers the acquired source address to the sender decision unit 126a of the security manager 126.

Step S32: The sender decision unit 126a determines whether or not the sender of the archive 40 is the gateway 110. Specifically, the sender decision unit 126a compares the preset IP address of the gateway 110 with the received source address to determine whether or not the two are the same. If the two addresses coincide, it is judged that the archive 40 has been transmitted from the gateway 110. If the sender of the archive 40 is the gateway 110, the process proceeds to Step S33; if not, the process proceeds to Step S35.

Step S33: The job manager 122 separates the file in the archive 40 and extracts the program 41 and the supplementary information 42. Where the archive 40 has been compressed into a certain format, the job manager 122 separates the file after decompressing the archive 40. Also, the job manager 122 notifies the sender decision unit 126a in the security manager 126 of the filename of the program 41.

Step S34: The sender decision unit 126a stores the filename of the program 41 in the safe program list 126b, whereupon the process proceeds to Step S36.

Step S35: The job manager 122 separates the file in the archive 40 to extract the program 41 and the supplementary information 42.

Step S36: The job manager 122 stores, in the program storage 124, the program 41 and the supplementary information 42 extracted from the archive 40.

Step S37: The job manager 122 outputs, to the OS 123, a request to start the program 41.

Step S38: The safety decision unit 126c of the security manager 126 determines safety of the program 41 specified by the start request. Specifically, the safety decision unit 126c looks up the safe program list 126b and, if the filename of the program 41 is stored in the list, judges that the program is reliable (safe). On the other hand, if the filename of the program 41 is not stored in the safe program list 126b, the safety decision unit 126c judges that the program is not reliable (safety of the program cannot be guaranteed). If the program 41 is judged safe, the process proceeds to Step S41; if safety of the program 41 cannot be guaranteed, the process proceeds to Step S39.

Step S39: Since safety of the program cannot be guaranteed, the virus checker 126d of the security manager 126 performs the virus check on the program 41.

Step S40: The virus checker 126d determines whether or not any security problem has been detected as a result of the virus check. If no problem has been found, the process proceeds to Step S41; if a problem has been detected, the process terminates without starting the job execution process 125.

Step S41: The OS 123 generates the job execution process 125 in compliance with the start request. Further, the OS 123 passes the program 41 on to the job execution process 125, whereupon the job execution process 125 executes the job in accordance with the program 41.

As described above, the programs of jobs submitted from the reliable grid manager are all judged reliable, so that the virus check can be omitted. Consequently, the virus check can be omitted with respect to the programs which job submitters have carefully created on their own responsibility, whereby deterioration in the performance due to the security check performed in the individual nodes can be prevented.

Second Embodiment

The second embodiment will be now described. In the second embodiment, the grid manager of the gateway performs code check at the time of distributing jobs, and the individual nodes omit code check when starting the jobs.

Figure 9:
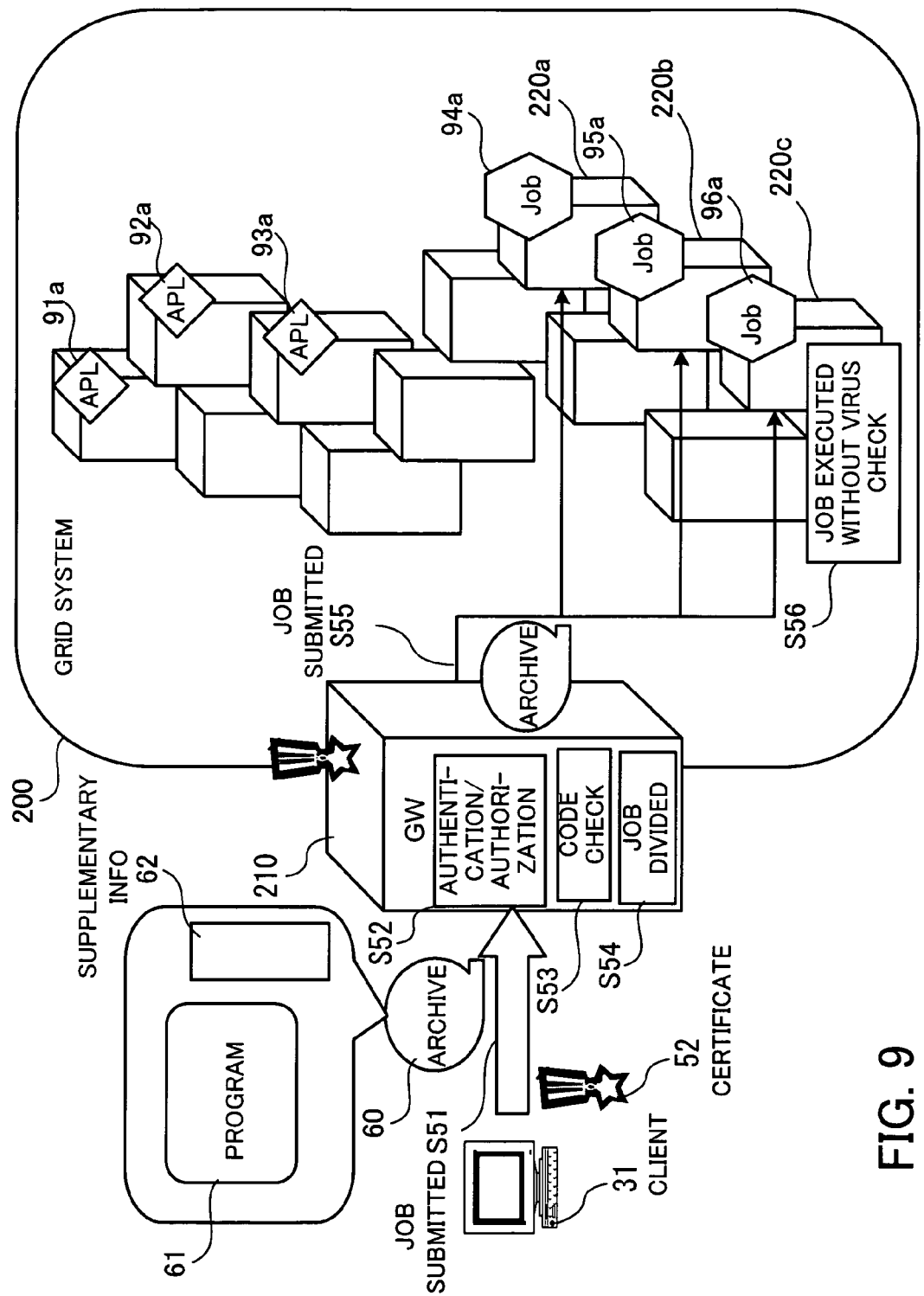
FIG. 9 is a conceptual diagram illustrating a process according to a second embodiment.

FIG. 9 is a conceptual diagram illustrating a process according to the second embodiment. As shown in FIG. 9, a grid system 200 includes a gateway 210 and nodes 220a, 220b, 220c, . . . . The nodes constituting the grid system 200 execute client applications 91a to 93a, and among these, some nodes (in the example of FIG. 9, nodes 220a, 220b and 220c) execute jobs 94a to 96a.

First, a job is submitted from the client 31 (Step S51). When submitting the job, the client 31 transmits an archive 60 with a certificate 52, in addition to a job execution request, to the gateway 210. The archive 60 contains a program 61 and supplementary information 62.

On receiving the archive 60 with the certificate 52, the gateway 210 checks the certificate 52 for authentication and authorization (Step S52). Further, the gateway 210 performs virus check (code check) on the program 61 contained in the archive 60 (Step S53). If authenticity of the certificate 52 is verified and also if no problem is detected by the code check, the gateway 210 divides the job (Step S54) and then submits the divided jobs to the respective nodes 220a, 220b and 220c (Step S55).

When the jobs are submitted, a job execution request and the archive 60 are transmitted to each of the nodes 220a, 220b and 220c. At the nodes 220a, 220b and 220c to which the jobs have been submitted, the program 61 and the supplementary information 62 are extracted from the archive 60 and the program 61 is executed. At this time, each of the nodes 220a, 220b and 220c checks the sender of the submitted job and, on ascertaining that the job has been submitted from a reliable grid manager (in the second embodiment, function incorporated in the gateway 210), instantly executes the program 61 without performing the code check (Step S56).

Figure 10:
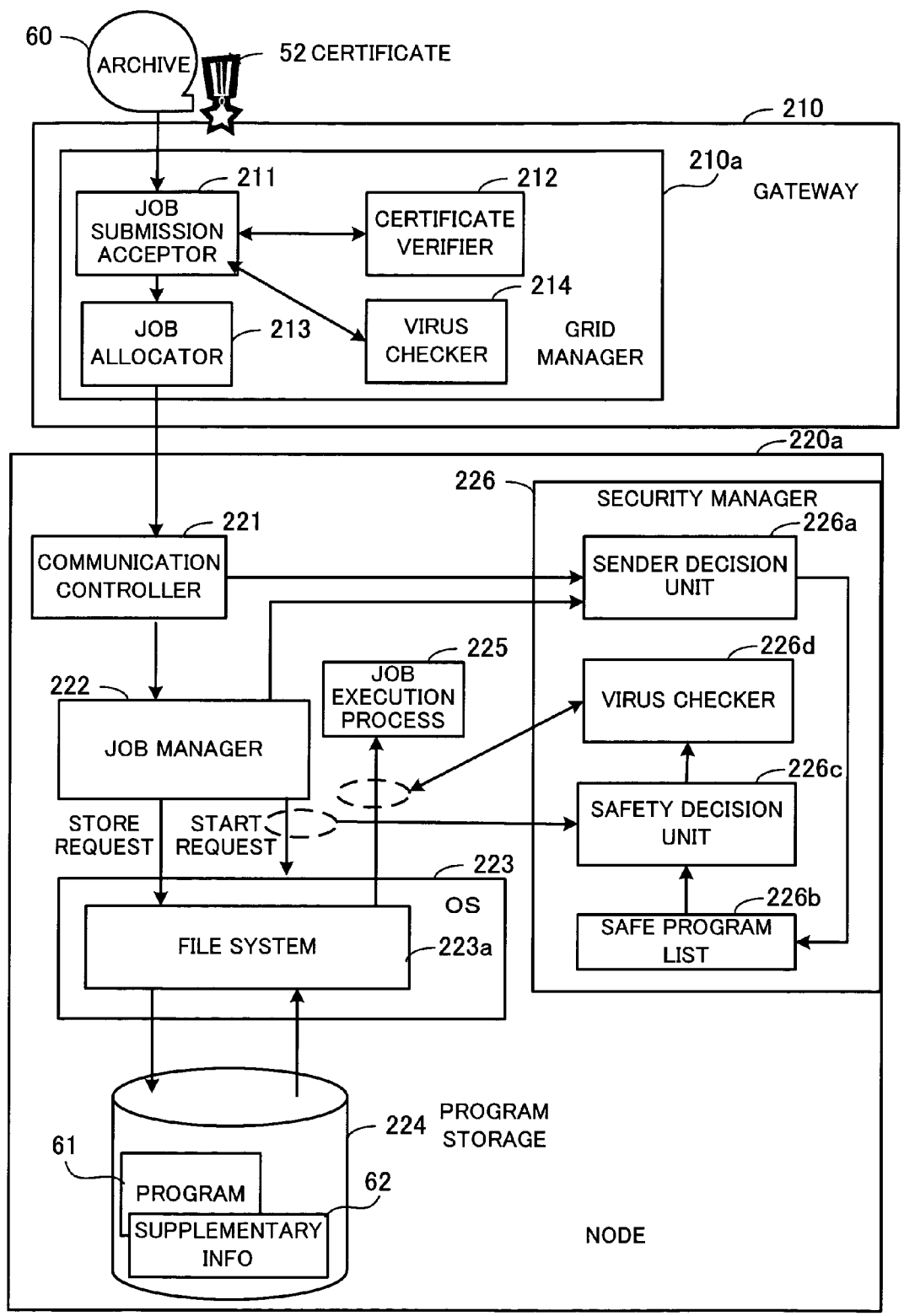
FIG. 10 is a block diagram illustrating the processing functions of the gateway and the node according to the second embodiment.

FIG. 10 is a block diagram illustrating the processing functions of the gateway and the node according to the second embodiment. In FIG. 10, the function of the node 220a is illustrated as a typical example, and the other nodes also have the same function as the node 220a.

The gateway 210 has a grid manager 210a for managing jobs to be executed by the grid system 200. The grid manager 210a comprises a job submission acceptor 211, a certificate verifier 212, a job allocator 213, and a virus checker 214.

When the archive 60 with the certificate 52 is received from the client 31, the job submission acceptor 211 transfers the archive 60 to the virus checker 214 and also transfers the certificate 52 to the certificate verifier 212. Then, if the result of verification received from the certificate verifier 212 is that the certificate is authentic and also if the check result received from the virus checker 214 is that no problem has been detected, the job submission acceptor 211 transfers the archive 60 to the job allocator 213.

Based on the received certificate 52, the certificate verifier 212 verifies whether the author of the archive 60 is authentic or not. This authentication process is performed, for example, by making a request for authentication to a certification authority, not shown. If the certificate 52 is found to be authentic, the certificate verifier 212 notifies the job submission acceptor 211 of authenticity of the certificate.

The virus checker 214 extracts the program 61 from the received archive 60 and performs code check. Specifically, the virus checker 214 holds code information about a plurality of code sequences that appear in virus-infected files, and determines whether or not the program 61 contains such a code sequence showing virus infection.

If the program does not contain a code sequence showing virus infection, the virus checker 214 notifies the job submission acceptor 211 that no problem has been found in the program. On the other hand, if a code sequence showing virus infection is found, the virus checker 214 notifies the job submission acceptor 211 that a virus has been detected. In cases where a virus has been detected but can be eliminated by the virus checker 214, the virus checker may first remove the virus from the program 61 and then notify the job submission acceptor 211 that no problem has been found.

In order to have the submitted job executed by a plurality of nodes, the job allocator 213 determines nodes which are to execute the job. After determining the nodes for executing the job, the job allocator 213 submits the job to the individual nodes.

The node 220a has a communication controller 221, a job manager 222, an OS 223, a program storage 224, a job execution process 225, and a security manager 226. The security manager 226 includes a sender decision unit 226a, a safe program list 226b, a safety decision unit 226c, and a virus checker 226d. The elements constituting the node 220a are identical in function with the corresponding ones constituting the node 120a of the first embodiment shown in FIG. 5, and therefore, description of the functions of the individual elements constituting the node 220a is omitted.

The configuration described above enables the individual nodes to omit the code check when executing jobs. The following describes the process performed from the submission to the execution of a job.

Figure 11:
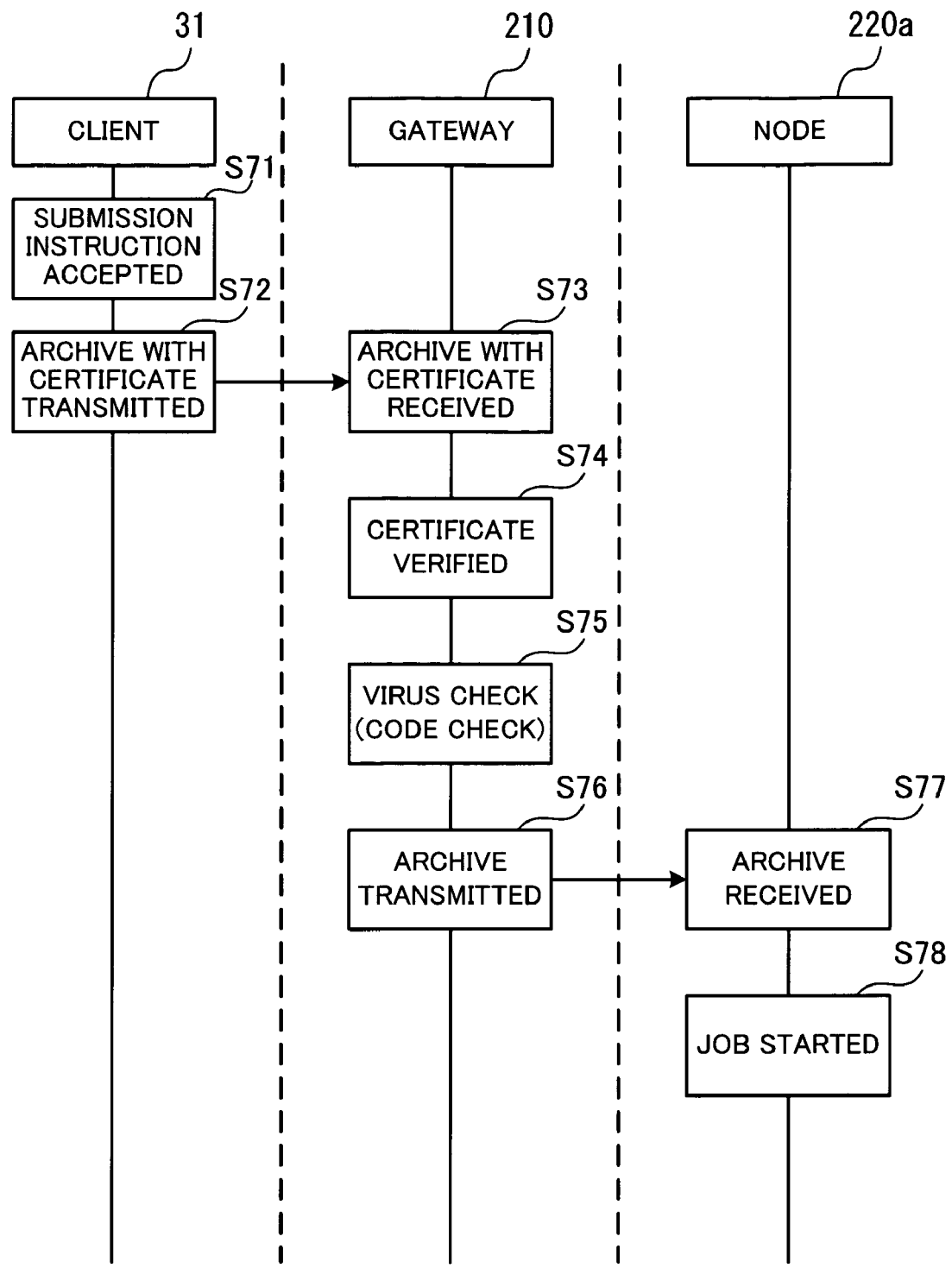
FIG. 11 is a sequence diagram illustrating a job execution procedure according to the second embodiment.

FIG. 11 is a sequence diagram illustrating the job execution procedure according to the second embodiment. In the following, the process shown in FIG. 11 will be explained in order of step number.

Step S71: The client 31 accepts a job submission instruction from the user.

Step S72: The client 31 transmits the archive 60 with the certificate 52 to the gateway 210.

Step S73: On receiving the archive 60 with the certificate 52, the job submission acceptor 211 of the gateway 210 transfers the certificate 52 to the certificate verifier 212.

Step S74: The certificate verifier 212 of the gateway 210 verifies whether the certificate 52 is authentic or not and notifies the job submission acceptor 211 of the result of verification.

Step S75: The virus checker 214 of the gateway 210 extracts the program 61 from the archive 60 and performs the virus check (code check) on the program.

Step S76: If authenticity of the certificate 52 is verified and also if no problem is detected by the code check, the job submission acceptor 211 transfers the archive 60 to the job allocator 213. The job allocator 213 selects one or more nodes which are to execute the job, and then transmits the archive 60 to the selected nodes. In the illustrated example, the archive 60 is transmitted to the node 220a.

Step S77: The node 220a receives the archive 60.

Step S78: The node 220a starts the job execution process 225 and executes the program 61 contained in the received archive 60. The process executed by the node 220a is identical with that performed in the first embodiment shown in FIG. 8.

In this manner, the code check is performed once in the grid manager 210a, so that the individual nodes can omit the code check. It is therefore unnecessary for the individual nodes to again perform the code check, making it possible to enhance the processing efficiency of the nodes.

Third Embodiment

In the third embodiment, the grid manager affixes, to a job, a signature indicating whether the program is "reliable" or "unreliable" as well as a mark (information indicative of safety), to allow the individual nodes to determine whether to perform or omit the virus check. Also, even in cases where programs are reliable, different marks are affixed depending on the level of reliability so that the individual nodes may perform the virus check differently (the nodes may perform real-time monitoring only or perform both the code check and the real-time monitoring) depending on the reliability level.

Figure 12:
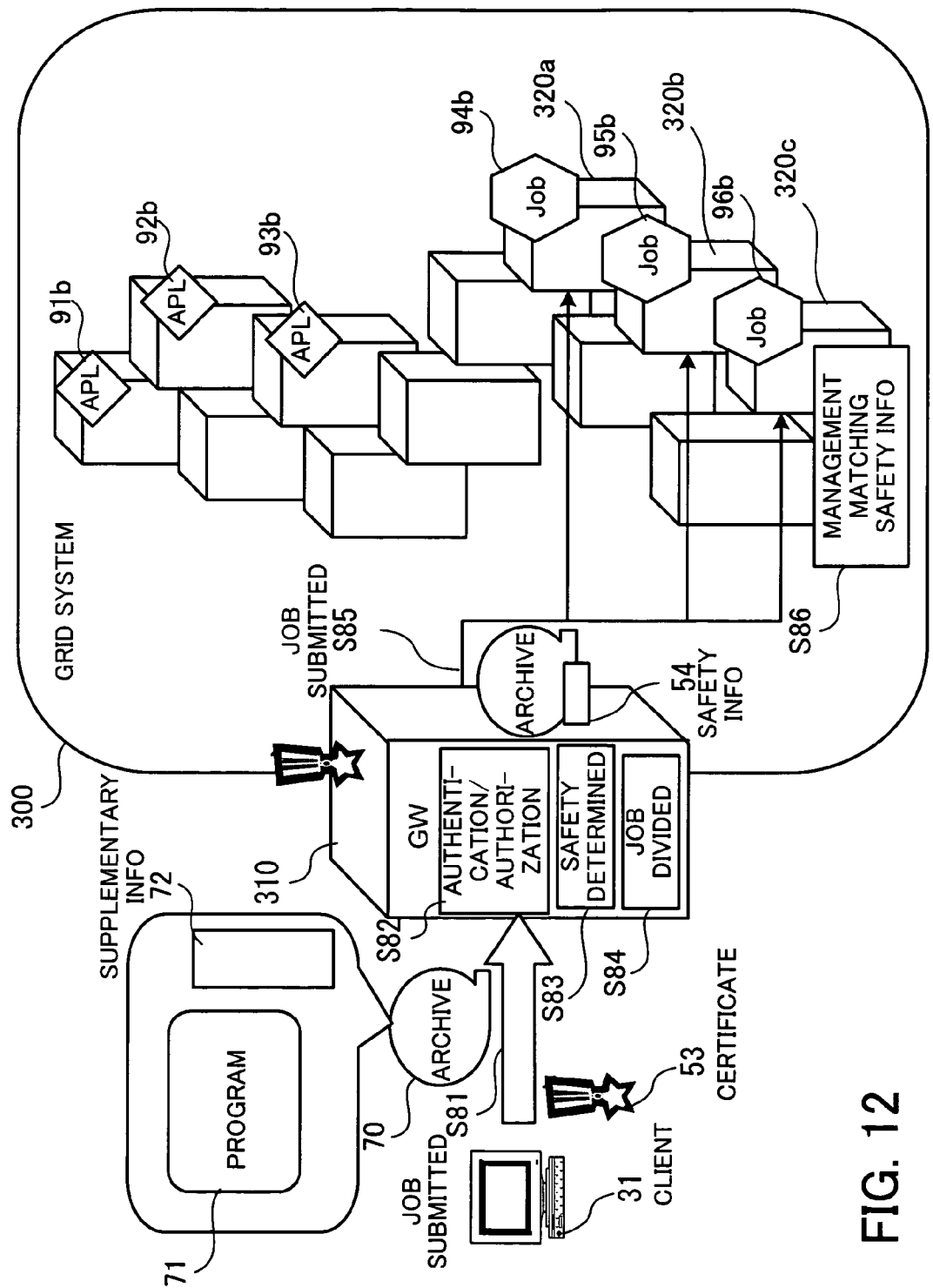
FIG. 12 is a conceptual diagram illustrating a process according to a third embodiment.

FIG. 12 is a conceptual diagram illustrating a process according to the third embodiment. As shown in FIG. 12, a grid system 300 includes a gateway 310 and nodes 320a, 320b, 320c . . . . The nodes constituting the grid system 300 execute client applications 91b to 93b, and among these, some nodes (in the example of FIG. 12, nodes 320a, 320b and 320c) execute jobs 94b to 96b.

First, a job is submitted from the client 31 (Step S81). When submitting a job, the client 31 transmits an archive 70 with a certificate 53, in addition to a job execution request, to the gateway 310. The archive 70 contains a program 71 and supplementary information 72.

On receiving the archive 70 with the certificate 53, the gateway 310 checks the certificate 53 for authentication and authorization (Step S82). Further, the gateway 310 identifies the client 31 and determines safety according to the client 31 (Step S83). Subsequently, the gateway 310 divides the job (Step S84) and submits the divided jobs to the respective nodes 320a, 320b and 320c (Step S85). At this time, a job execution request and the archive 70 affixed with safety information 54 indicative of the safety are transmitted to each of the nodes 320a, 320b and 320c.

Thus, the nodes 320a, 320b and 320c, to which the jobs have been allocated, each receive the job execution request and the archive 70. At the nodes 320a, 320b and 320c, the program 71 and the supplementary information 72 are extracted from the archive 70 and the program 71 is executed. At this time, the nodes 320a, 320b and 320c perform security management in accordance with the safety information 54 (Step S86).

Figure 13:
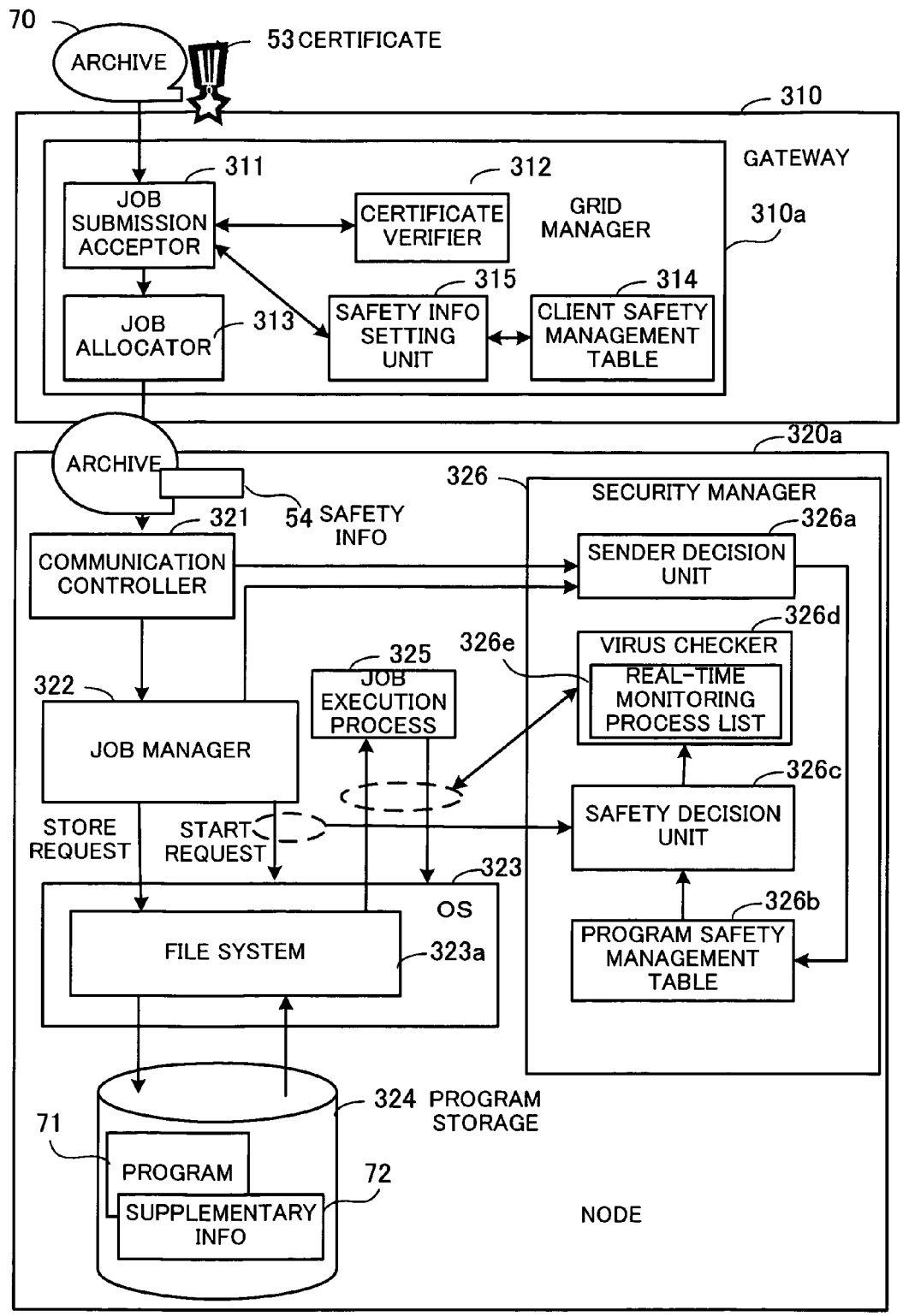
FIG. 13 is a block diagram illustrating the processing functions of the gateway and the node according to the third embodiment.

FIG. 13 is a block diagram illustrating the processing functions of the gateway and the node according to the third embodiment. In FIG. 13, the function of the node 320a is illustrated as a typical example, and the other nodes also have the same function as the node 320a.

The gateway 310 has a grid manager 310a for managing jobs to be executed by the grid system 300. The grid manager 310a comprises a job submission acceptor 311, a certificate verifier 312, a job allocator 313, a client safety management table 314, and a safety information setting unit 315.

On receiving the archive 70 with the certificate 53 from the client 31, the job submission acceptor 311 transfers identification information (e.g., IP address) indicative of the sender of the archive 70 to the safety information setting unit 315 and also transfers the certificate 53 to the certificate verifier 312. Then, after receiving the result of verification authenticating the certificate from the certificate verifier 312 as well as the safety information from the safety information setting unit 315, the job submission acceptor 311 transfers the archive 70 affixed with the safety information 54 to the job allocator 313.

The certificate verifier 312 verifies whether the author of the archive 70 is authentic or not based on the received certificate 53. This authentication process is performed, for example, by making a request for authentication to a certification authority, not shown. If the certificate 53 is found to be authentic, the certificate verifier 312 notifies the job submission acceptor 311 of authenticity of the certificate.

In the client safety management table 314, the identifications of a plurality of clients (client 31 shown in FIG. 12 as well as many other clients, not shown) are registered in association with the levels of reliability of the respective clients. For the client identification, the IP address may be used, for example.

When the identification information indicating the sender of the archive 70 is received from the job submission acceptor 311, the safety information setting unit 315 looks up the client safety management table 314 to determine the reliability level corresponding to the identification information. The safety information setting unit 315 then outputs the safety information 54 including the reliability level and the signature to the job submission acceptor 311.

In order to have the submitted job executed by a plurality of nodes, the job allocator 313 determines nodes which are to execute the job. After determining the nodes for executing the job, the job allocator 313 submits the job to the individual nodes. Specifically, the job allocator 313 transmits the archive 70 with the safety information 54 to each of the determined nodes.

The node 320a has a communication controller 321, a job manager 322, an OS 323, a program storage 324, a job execution process 325, and a security manager 326. The elements constituting the node 320a, except the communication controller 321 and the security manager 326, are identical in function with the corresponding elements constituting the node 120a of the first embodiment shown in FIG. 5. In the following, therefore, only the communication controller 321 and the security manager 326 will be explained and description of the functions of the other elements constituting the node 320a is omitted.

On receiving the archive 70 affixed with the safety information 54, the communication controller 321 transfers the archive 70 to the job manager 322 and also transfers the safety information 54 to a sender decision unit 326a of the security manager 326.

When the submitted job is executed, the security manager 326 performs security monitoring in accordance with the safety information. The security monitoring includes code check executed at the start of the program and real-time monitoring performed during execution of the program.

The real-time monitoring is a process for intercepting a request when the request is output to the OS 323 from the process executing the program, to ascertain that the request is not an improper request demanding an improper process. The request is passed on to the OS 323 only if it is not an improper request. Improper process denotes, for example, a process that alters the contents of important files of the OS 323 or a process that changes the environment settings in such a manner as to make access from outside easier.

To carry out the security monitoring, the security manager 326 includes, in addition to the sender decision unit 326a, a program safety management table 326b, a safety decision unit 326c, and a virus checker 326d.

The sender decision unit 326a acquires the safety information 54 from the communication controller 321. Then, based on the signature in the safety information 54, the sender decision unit 326a identifies the gateway 310 as the sender of the archive 70.

Also, the sender decision unit 326a acquires the filename of the program 71 contained in the archive 70 from the job manager 322, and stores a pair of information items, that is, the acquired filename and the reliability level included in the safety information 54, in the program safety management table 326b.

In the program safety management table 326b are registered pairs of information items each consisting of the filename of the program extracted from the archive 70 affixed with the safety information 54 and the reliability level of the corresponding program.

When a start request specifying the filename of the program 71 is output from the job manager 322 to the OS 323, the safety decision unit 326c checks safety of the file specified by the start request. Specifically, the safety decision unit 326c determines whether or not the filename specified by the start request is registered in the program safety management table 326b. If the filename is registered in the program safety management table 326b, the reliability level corresponding to the filename is extracted from the program safety management table 326b. Then, based on the reliability level, the safety decision unit 326c notifies the virus checker 326d whether the code check is needed or not and whether the real-time monitoring is needed or not.

The virus checker 326d performs virus check on the program in the manner described below. When the program 71 is read out by the OS 323 in response to the start request from the job manager 322, the virus checker 326d is notified from the safety decision unit 326c whether the code check is needed or not, before the program 71 is transferred to the job execution process 325.

If no code check is required, the virus checker 326d transfers the program 71, which has been read out via the file system 323a in response to the start request, to the job execution process 325 without performing the virus check. On the other hand, if the virus check is required, the virus checker 326d performs the virus check on the program 71 read out via the file system 323a in response to the start request. If, as a result of the virus check, no problem is detected, the virus checker 326d transfers the program 71 to the job execution process 325.

Also, the virus checker 326d manages, by means of a real-time monitoring process list 326e, information indicating whether the job execution process 325 requires the real-time monitoring or not. In the real-time monitoring process list 326e, a flag (real-time monitoring flag) indicating whether the real-time monitoring is required or not is set in association with the process ID of each process started in response to the start request from the job manager 322. The virus checker 326d determines based on the real-time monitoring process list 326e whether or not the job execution process 325 is a target of real-time monitoring. If the job execution process is a target of real-time monitoring, the virus checker 326d intercepts every request output from the job execution process 325 to the OS 323, to ascertain that the request is not an improper request. If the request is not an improper request, the virus checker 326d passes the request on to the OS 323. On the other hand, if the request is improper, the virus checker 326d discards the request.

FIG. 14 exemplifies the data structure of the client safety management table. The client safety management table 314 has columns "ID" and "RELIABILITY". In the column "ID" are set the identifications of clients, for example, the clients' IP addresses. In the column "RELIABILITY" are set numerical values indicating the levels of reliability of the corresponding clients.

In the example of FIG. 14, the reliability is classified into three levels. A client with the highest level of reliability is assigned a reliability level "Lv. 3", a client with the second highest level of reliability is assigned a reliability level "Lv. 2", and a client with the lowest level of reliability is assigned a reliability level "Lv. 1".

Where the reliability level of the sender of the archive 70 is "Lv. 3", both the code check and the real-time monitoring are omitted when executing the job based on the archive 70. Where the reliability level of the sender of the archive 70 is "Lv. 2", the real-time monitoring is omitted when executing the job based on the archive 70, and where the reliability level of the sender of the archive 70 is "Lv. 1", the virus check should not be omitted when executing the job based on the archive 70.

FIG. 15 exemplifies the data structure of the program safety management table. The program safety management table 326b has columns "FILENAME" and "RELIABILITY". In the column "FILENAME" are set the filenames of programs 71 extracted from the archives 70 submitted as jobs, and in the column "RELIABILITY" are set the levels of reliability indicated by the safety information affixed to the archives 70.

Figure 16:
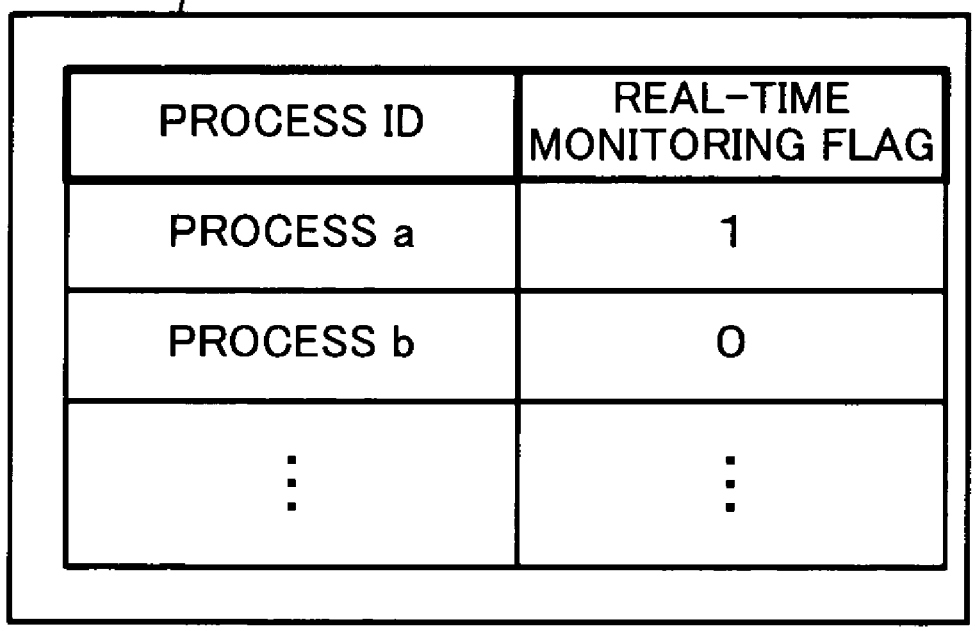
FIG. 16 shows an exemplary data structure of a real-time monitoring process list.

FIG. 16 exemplifies the data structure of the real-time monitoring process list. The real-time monitoring process list 326e has columns "PROCESS ID" and "REAL-TIME MONITORING FLAG". In the column "PROCESS ID" are set the process IDs of job execution processes started by the OS in response to the start request from the job manager 322.

The configuration described above enables the individual nodes to omit the virus check or the real-time monitoring or both when executing jobs. The following describes the process performed from the submission to the execution of a job.

Figure 17:
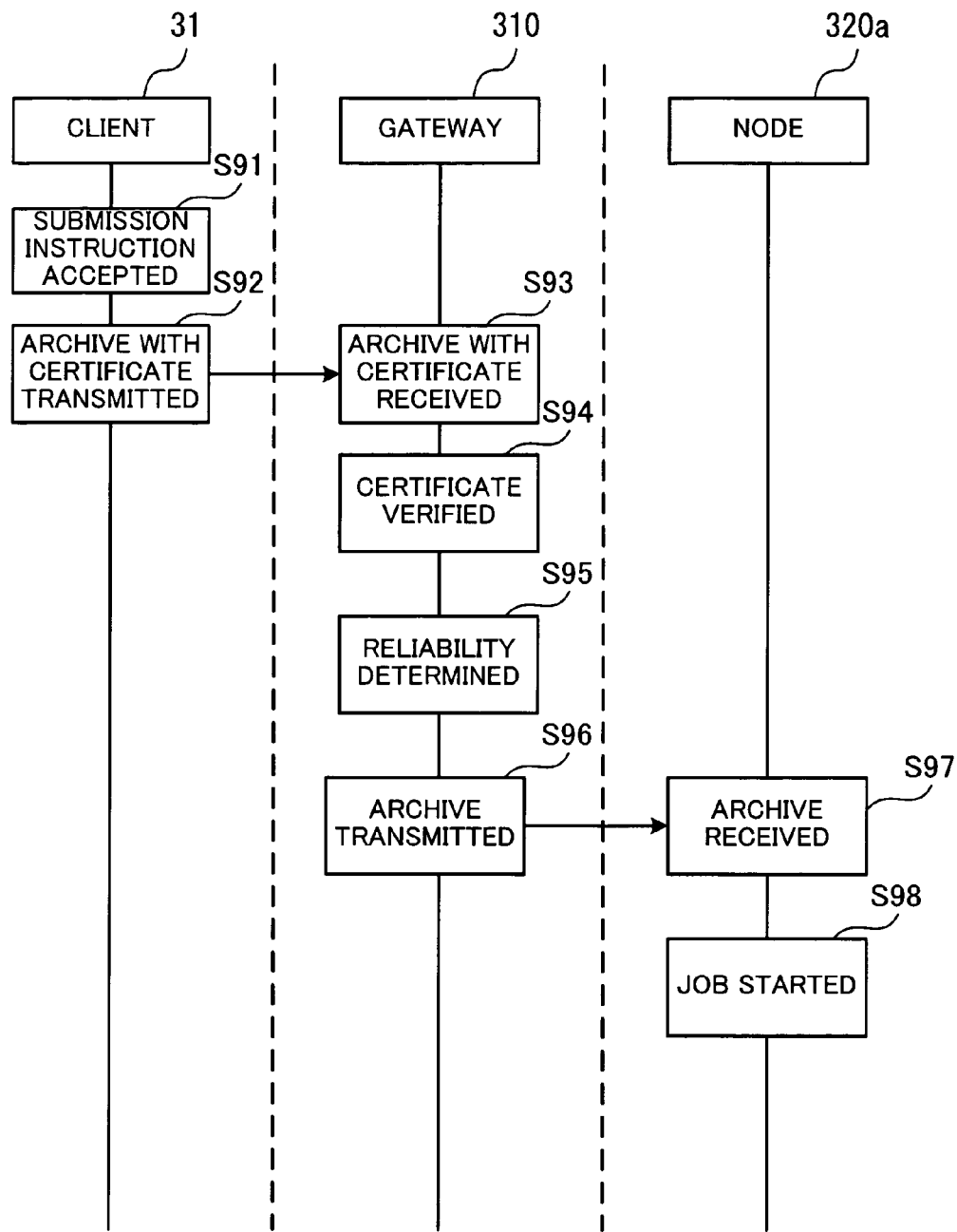
FIG. 17 is a sequence diagram illustrating a job execution procedure according to the third embodiment.

FIG. 17 is a sequence diagram illustrating a job execution procedure according to the third embodiment. In the following, the process shown in FIG. 17 will be explained in order of step number.

Step S91: The client 31 accepts a job submission instruction from the user.

Step S92: The client 31 transmits the archive 70 with the certificate 53 to the gateway 310.

Step S93: On receiving the archive 70 with the certificate 53, the job submission acceptor 311 of the gateway 310 transfers the certificate 53 to the certificate verifier 312 and also transfers the identification information of the client 31 to the safety information setting unit 315.

Step S94: The certificate verifier 312 of the gateway 310 verifies whether the certificate 53 is authentic or not and notifies the job submission acceptor 311 of the result of verification.

Step S95: The safety information setting unit 315 looks up the client safety management table 314 and determines the reliability level of the client 31, which is the sender of the archive 70, based on the identification information of the client. The reliability level thus determined is transferred to the job submission acceptor 311.

Step S96: If authenticity of the certificate 53 is verified, the job submission acceptor 311 transfers the archive 70, which is affixed with the safety information 54 including the reliability level and the signature, to the job allocator 313. The job allocator 313 selects one or more nodes which are to execute the job, and then transmits the archive 70 to the selected nodes. In the illustrated example, the archive 70 is transmitted to the node 320a.

Step S97: The node 320a receives the archive 70.

Step S98: The node 320a starts the job execution process 325 and executes the program 71 contained in the received archive 70. The process executed by the node 320a will be explained in detail with reference to FIG. 18.

Figure 18:
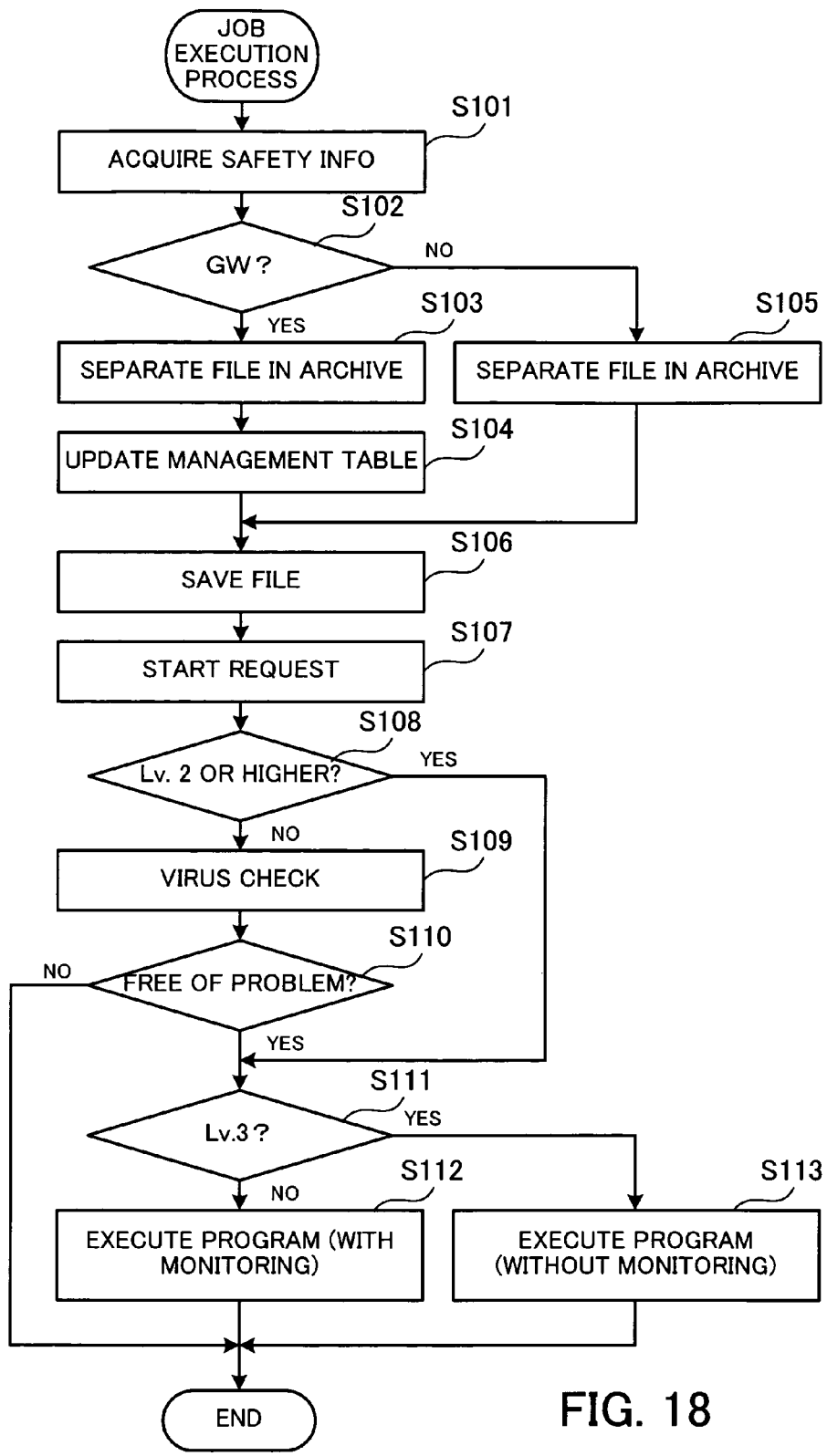
FIG. 18 is a flowchart illustrating a job execution process executed by the node.

FIG. 18 is a flowchart illustrating the job execution process performed by the node. In the following, the process shown in FIG. 18 will be explained in order of step number.

Step S101: The communication controller 321 acquires the safety information 54 affixed to the received archive 70, and then transfers the acquired safety information to the sender decision unit 326a of the security manager 326. Also, the communication controller 321 transfers the archive 70 to the job manager 322.

Step S102: The sender decision unit 326a determines whether or not the sender of the archive 70 is the gateway 310. Specifically, the sender decision unit 326a determines whether or not the signature included in the safety information 54 coincides with the preset signature of the gateway 310. If the two signatures coincide, it is judged that the archive 70 has been transmitted from the gateway 310. If the sender of the archive 70 is the gateway 310, the process proceeds to Step S103; if not, the process proceeds to Step S105.

Step S103: The job manager 322 separates the file in the archive 70 to extract the program 71 and the supplementary information 72. Also, the job manager 322 notifies the sender decision unit 326a in the security manager 326 of the filename of the program 71.

Step S104: The sender decision unit 326a updates the program safety management table 326b. Specifically, the sender decision unit 326a acquires the reliability level of the program 71 on the basis of the safety information 54 received from the communication controller 321, and then registers the pair of information items, that is, the filename and reliability level of the program 71, in the program safety management table 326b. The process then proceeds to Step S106.

Step S105: The job manager 322 separates the file in the archive 70 to extract the program 71 and the supplementary information 72.

Step S106: The job manager 322 stores, in the program storage 324, the program 71 and the supplementary information 72 extracted from the archive 70.

Step S107: The job manager 322 outputs, to the OS 323, a request to start the program 71.

Step S108: The safety decision unit 326c of the security manager 326 determines safety of the program 71 specified by the start request. Specifically, the safety decision unit 326c looks up the program safety management table 326b to determine the reliability level of the program 71 on the basis of the filename thereof. If it is judged by the safety decision unit 326c that the reliability level is "Lv. 2" or higher, the process proceeds to Step S111. On the other hand, if it is judged by the safety decision unit 326c that the reliability level is "Lv. 1", the process proceeds to Step S109.

Step S109: Since it is judged by the safety decision unit 326c that the reliability level is "Lv. 1", the virus checker 326d of the security manager 326 performs the code check on the program 71.

Step S110: The virus checker 326d determines whether or not any security problem has been detected by the code check. If no problem is found, the process proceeds to Step S111; if any problem has been detected, the process terminates without starting the job execution process 325.

Step S111: The safety decision unit 326c determines whether or not the reliability level of the program 71 specified by the start request is "Lv. 3". If the reliability level is "Lv. 3", the process proceeds to Step S113; if not, the process proceeds to Step S112.

Step S112: The OS 323 generates the job execution process 325 in compliance with the start request. Further, the OS 323 passes the program 71 on to the job execution process 325, whereupon the job execution process 325 executes the job in accordance with the program 71.

At this time, the virus checker 326d sets "1" for the real-time monitoring flag in the real-time monitoring process list 326e corresponding to the process ID of the job execution process 325 started by the OS 323. The job execution process 325 then executes process in accordance with the program 71. The virus checker 326d monitors the operation of the job execution process 325 and, each time a request is output to the OS 323, determines whether the request is an improper one or not. The request is passed on to the OS 323 only if it is not an improper request.

Step S113: The OS 323 generates the job execution process 325 in compliance with the start request. Further, the OS 323 transfers the program 71 to the job execution process 325, whereupon the job execution process 325 executes the job in accordance with the program 71.

At this time, the virus checker 326d sets "0" for the real-time monitoring flag in the real-time monitoring process list 326e corresponding to the process ID of the job execution process 325 started by the OS 323. Consequently, the job execution process 325 thereafter executes process in accordance with the program 71, without the real-time monitoring being performed by the virus checker 326d.

In this manner, where the submitted job is from the reliable client 31, the individual nodes omit the code check or the real-time monitoring or both. It is also possible to omit the code check only, depending on the level of reliability of the client 31.

In the aforementioned example, three levels of reliability are set as the safety information, but a flag (safety mark) indicative of safety may be affixed, as the safety information, to the archive 70. In this case, the individual nodes omit the code check and the real-time monitoring if the safety mark is affixed, and perform the code check and the real-time monitoring if the safety mark is not affixed.

Also, in the third embodiment, no virus check (code check) is carried out in the gateway 310. Alternatively, the gateway 310 may be adapted to perform virus check as in the second embodiment. In this case, where the reliability level of the sender of the program on which the virus check has been performed is "Lv. 1", the reliability level to be set in the safety information 54 may be changed to "Lv. 2". This permits the individual nodes to omit the code check with respect to the program which has been subjected to the code check in the gateway 310.

Further, the real-time monitoring is explained with reference only to the third embodiment, but also in the first and second embodiments, the real-time monitoring is performed in the individual nodes as the case may be. Also in such cases, the real-time monitoring may be omitted when a program transmitted from a reliable device is executed, as in the third embodiment.

The processing functions described above with reference to the embodiments can be performed by a computer. In this case, a program is prepared in which is described the process for performing the function of the gateway or the function of each node. The program is executed by a computer, whereupon the aforementioned processing function is accomplished by the computer. The program describing the process may be recorded on computer-readable recording media. Computer-readable recording media include magnetic recording devices, optical discs, magneto-optical recording media, semiconductor memories, etc. Magnetic recording devices include a hard disk drive (HDD), a flexible disk (FD), a magnetic tape, etc. Optical discs include a DVD (Digital Versatile Disc), a DVD-RAM (Random Access Memory), a CD-ROM (Compact Disc Read Only Memory), a CD-R (Recordable)/RW (ReWritable), etc. Magneto-optical recording media include an MO (Magneto-Optical disk) etc.

To market the program, portable recording media, such as DVDs and CD-ROMs, on which the program is recorded may be put on sale, for example. Alternatively, the program may be stored in the storage device of a server computer and may be transferred from the server computer to other computers via a network.

The computer which is to execute the program stores in its storage device the program recorded on a portable recording medium or transferred from the server computer, for example. Then, the computer loads the program from its storage device and performs process in accordance with the program. The computer may load the program directly from the portable recording medium to perform the process in accordance with the program. Also, as the program is transferred from the server computer, the computer may sequentially execute the process in accordance with the received program.

According to the present invention, whether the sender of a job is a reliable device or not is determined, and if the sender is judged to be a reliable device, the code check of the program is omitted when the job is executed, whereby the processing load applied at the time of executing the job can be lessened.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable, non-transitory medium recording a security management program for managing security of jobs submitted via a network, wherein the security management program causes a computer to function as:
   a sender decision unit, responsive to a request to execute a job including a program, to determine whether or not the program has been transmitted from a reliable device, by comparing an identification of a sender of the job with those indicated in reliable device information indicating identification of reliable devices;
   a job manager to store the program of the job in a storage device and output a start request specifying the program;
   a safety decision unit to cause an operating system to execute the start request while omitting virus checking of the program when it is judged by the sender decision unit that the program specified by the start request output from the job manager has been transmitted from a reliable device, and output a virus check request when it is judged by the sender decision unit that the program specified by the start request has been transmitted from a device other than the reliable devices; and
   a virus checker, responsive to the virus check request output from the safety decision unit, to read out the program specified by the start request from the storage device, execute a code check process for ascertaining that the program does not contain a code sequence included in a known virus, and, when the code sequence is not contained, cause the operating system to execute the start request.

2. The computer-readable, non-transitory medium according to claim 1, wherein, when the virus check request is output from the safety decision unit, the virus checker executes a real-time monitoring process in which a process executing the program is monitored and, when a request is output from the process to the operating system, the output request is checked to ascertain that the request is not a request demanding an improper process.

3. The computer-readable, non-transitory medium according to claim 1, wherein:
   the sender decision unit registers, in a safe program list, a program name of the program which is judged to have been transmitted from a reliable device, and
   the safety decision unit looks up the safe program list to determine whether or not it is judged by the sender decision unit that the program specified by the start request output from the job manager has been transmitted from a reliable device.

4. The computer-readable, non-transitory medium according to claim 1, wherein:
   the program is affixed with safety information indicative of safety of the program,
   the sender decision unit acquires the safety information, and
   when it is judged by the sender decision unit that the program specified by the start request output from the job manager has been transmitted from a reliable device, the safety decision unit causes the operating system to execute the start request when the safety information acquired by the sender decision unit shows that the program is safe, and outputs the virus check request when the safety information acquired by the sender decision unit does not show that the program is safe.

5. The computer-readable, non-transitory medium according to claim 4, wherein:
   the safety information indicates safety of the program by using three levels of reliability, the sender decision unit registers, in a program safety management table, a filename and reliability level of the program in a manner associated with each other, the safety decision unit causes the operating system to execute the start request output from the job manager when the reliability level of the program specified by the start request is highest, outputs a virus check request designating a code check when the reliability level is second highest, and outputs a virus check request designating the code check as well as real-time monitoring when the reliability level is third highest, and when the code check is designated in the virus check request output from the safety decision unit, the virus checker executes the code check process and, when the code sequence is not contained in the program, causes the operating system to execute the start request; and when the real-time monitoring is designated in the virus check request, the virus checker executes a real-time monitoring process in which a process executing the program is monitored and, each time a request is output from the process to the operating system, the output request is checked to ascertain that the request is not a request demanding an improper process.

6. A computer-readable, non-transitory medium recording a job submission management program for allocating a job requested from a client computer to a plurality of first computers to execute the job by distributed processing, wherein the job submission management program, when executed by a second computer intervening between the client computer and the first computers, causes the second computer to function as:

a certificate verifier, responsive to a job submission request including a certificate and a program from the client computer, to verify authenticity of the certificate;

a safety information setting unit to affix safety information to the program when the authenticity of the certificate is verified by the certificate verifier, the safety information indicating that the program is safe to execute in the first computers; and a job allocator to send at least one of the first computers a job execution request including the program to which the safety information has been affixed by the safety information setting unit.

7. The computer-readable, non-transitory medium according to claim 6, wherein the safety information setting unit looks up a client safety management table in which the client and safety of the program input from the client computer are registered in association with each other and in which the safety of the program is indicated by means of three levels of reliability, and sets, as the safety information, a reliability level corresponding to the client computer from which the job submission request including the program has been received.

8. A security management method for managing security of jobs submitted via a network, the security management method comprising:

causing, in response to a job submission request including a certificate and a program, a job management device to check the certificate for authenticity;

causing, when authenticity of the certificate is verified, the job management device to select a job execution device to which execution of a job is requested, and to transmit, to the selected job execution device, a request to execute a job including the program;

causing, in response to input of the job execution request with the program via the network, the job execution device holding in advance reliable device information indicating identifications of reliable devices to compare an identification of a sender of the job with those of the reliable device information to determine whether or not the program has been transmitted from a reliable device;

causing the job execution device to store the input program in a storage device and to output a start request specifying the program;

causing the job execution device to have an operating system execute the start request while omitting virus checking of the program when it is judged that the program specified by the start request has been transmitted from a reliable device, and to output a virus check request when it is judged that the program specified by the start request has been transmitted from a device other than the reliable devices; and causing, in response to the virus check request, the job execution device to read out the program specified by the start request from the storage device, to execute a code check process for ascertaining that the program does not contain a code sequence included in a known virus, and, when the code sequence is not contained, to cause the operating system to execute the start request.

9. The security management method according to claim 8, wherein, the job execution device executes a real-time monitoring process in which a process executing the program is monitored and, when a request is output from the process to the operating system, the output request is checked to ascertain that the request is not a request demanding an improper process.

10. The security management method according to claim 8, wherein:

when authenticity of the certificate is verified by the job management device, the job management device affixes safety information to the program to indicate that the program is safe, the job execution device acquires the safety information of the program, and when it is judged that the program specified by the start request has been transmitted from a reliable device, the job execution device causes the operating system to execute the start request when the acquired safety information shows that the program is safe, and outputs the virus check request when the acquired safety information does not show that the program is safe.

11. The security management method according to claim 10, wherein: the job management device looks up a client safety management table in which the client and safety of the program input from the client are registered in association with each other and in which the safety of the program is classified into three levels of reliability, and sets, as the safety information, a reliability level corresponding to the client from which the job submission request including the program has been received, the job execution device registers, in a program safety management table, a filename and reliability level of the program in a manner associated with each other, the job execution device causes the operating system to execute the start request when the reliability level of the program specified by the start request is highest, outputs a virus check request designating a code check when the reliability level is second highest, and outputs a virus check request designating the code check as well as real-time monitoring when the reliability level is third highest, and when the code check is designated in the virus check request, the job execution device executes the code check process and, when the code sequence is not contained in the program, causes the operating system to execute the start request; and when the real-time monitoring is designated in the virus check request, the job execution device executes a real-time monitoring process in which a process executing the program is monitored and, each time a request is output from the process to the operating system, the output request is checked to ascertain that the request is not a request demanding an improper process.

12. The security management method according to claim 8, wherein:

the job management device, in response to input of the job submission request including the certificate and the program, executes a code check process for checking the program to ascertain that the program does not contain the code sequence included in the known virus, and when authenticity of the certificate is verified and also when no problem is detected as a result of the code check process, the job management device selects a job execution device to which execution of the job is requested, and transmits the job execution request including the program to the selected job execution device.

* * * * *